United States Patent [19]

Tahara et al.

[11] Patent Number: 5,894,328
[45] Date of Patent: Apr. 13, 1999

[54] DIGITAL SIGNAL MULTIPLEXING METHOD AND APPARATUS AND DIGITAL SIGNAL RECORDING MEDIUM

[75] Inventors: Katsumi Tahara, Kanagawa; Mikita Yasuda, Tokyo; Noriaki Oishi; Shinji Negishi, both of Kanagawa, all of Japan

[73] Assignee: Sony Corporation, Tokyo, Japan

[21] Appl. No.: 08/769,902

[22] Filed: Dec. 19, 1996

[30] Foreign Application Priority Data

Dec. 27, 1995 [JP] Japan ................... 7-341951

[51] Int. Cl.$^6$ ............... H04N 7/12; H04N 11/02; H04N 11/04
[52] U.S. Cl. ............... 348/423; 348/462; 386/98
[58] Field of Search ............... 348/423, 424, 348/148, 462, 464, 845.2, 845.3, 13, 484; 386/70, 96, 82, 47, 92, 68, 98, 99, 94, 105, 106, 109, 125; 370/474, 487, 476, 537, 538, 60.1, 412; 360/60, 20; 358/426; H04N 7/12, 11/02, 11/04

[56] References Cited

U.S. PATENT DOCUMENTS

| | | | |
|---|---|---|---|
| 5,223,949 | 6/1993 | Honjo | 358/426 |
| 5,550,820 | 8/1996 | Baran | 370/60.1 |
| 5,583,654 | 12/1996 | Oguro | 386/96 |
| 5,629,740 | 5/1997 | Tanaka et al. | 348/484 |
| 5,671,226 | 9/1997 | Murakami et al. | 370/474 |
| 5,673,357 | 9/1997 | Shima | 386/94 |
| 5,729,282 | 3/1998 | Okawa | 348/13 |
| 5,802,239 | 9/1998 | Fujinami | 386/47 |
| 5,805,762 | 9/1998 | Boyee et al. | 386/68 |
| 5,815,634 | 9/1998 | Daum et al. | 386/96 |
| 5,822,324 | 10/1998 | Kostresti et al. | 370/487 |

*Primary Examiner*—Tommy P. Chin
*Assistant Examiner*—Tung T. Vo
*Attorney, Agent, or Firm*—Frommer Lawrence & Haug, LLP; William S. Frommer

[57] ABSTRACT

A digital signal multiplexing method in which plural bitstreams can be multiplexed without buffer rupture at the time of decoding. At a step S1, the time of extracting each accessing unit AU, which is a processing unit prescribed from one bitstream to another, from a buffer to an associated decoder, from input plural bitstreams, is computed. At the next step S2, the constraint time concerning the delivery start time to the buffer of each accessing unit, is back-computed by processing proceeding in a temporally retrogressive direction, using the data of the extraction time of the accessing units AU, and by reading charging of the accessing units to the decoder buffers for the extraction of the accessing units from the decoder buffers. At the next step S3, the schedule of packetizing the accessing units is determined on the basis of the constraint time as found at step S2, by way of performing the scheduling. The plural bitstreams are multiplexed in accordance with the schedule.

9 Claims, 15 Drawing Sheets

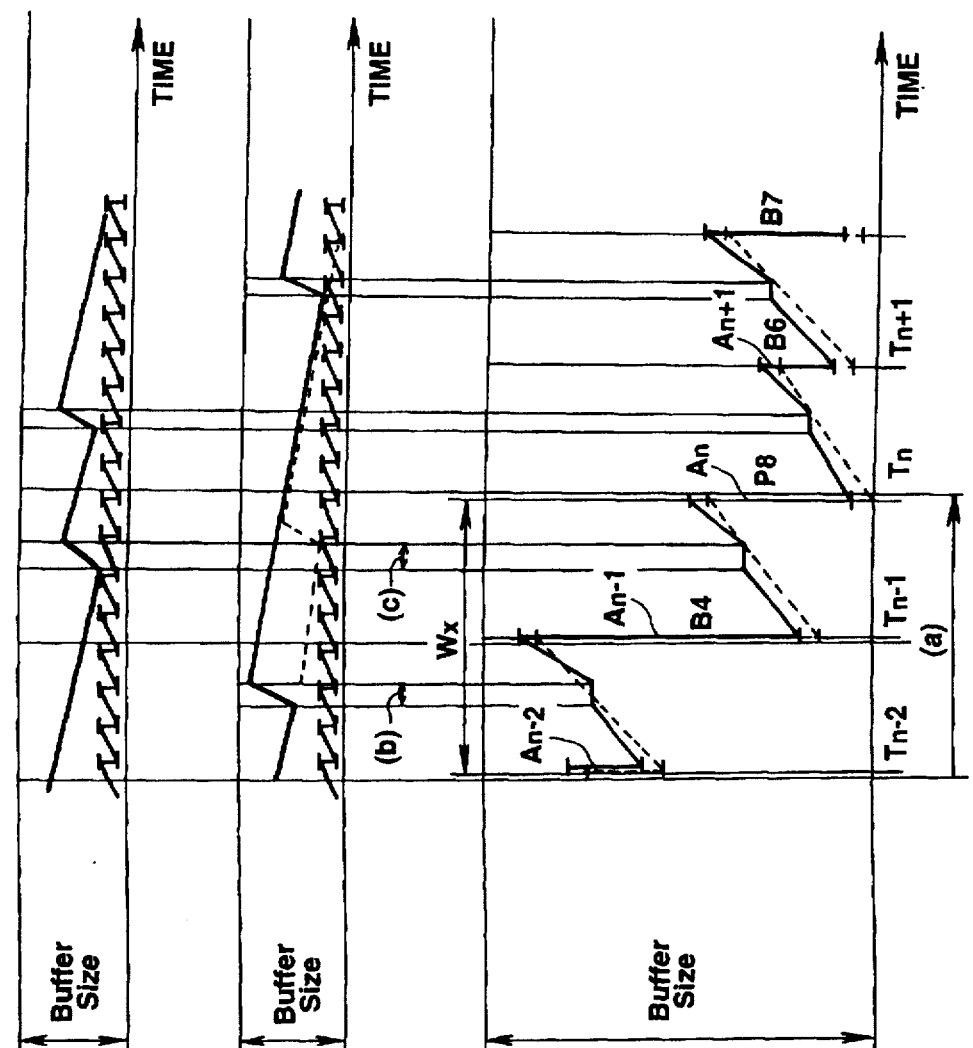

DIGITAL SIGNAL MULTIPLEXING METHOD AND APPARATUS AND DIGITAL SIGNAL RECORDING MEDIUM

BACKGROUND OF THE INVENTION

1. Field of the Invention

This invention relates to a method and apparatus for multiplexing moving picture signals and acoustic signals on, for example, a magneto-optical disc or a magnetic tape, reproducing the recorded signals and displaying the reproduced signals on a display, and for transmitting the moving picture or acoustic signals of a teleconferencing system, television telephone system or a broadcasting equipment over a transmission channel from a transmitter to a receiver for reception and display on the receiver. The invention also relates to a recording medium for recording the multiplexed signals.

2. Description of the related Art

It has been practiced to compress picture or acoustic signals in accordance with the compression system of a pre-set standard to generate digital bitstreams of various signals, multiplex the bitstreams to form a multiplexed bitstream and to separate the multiplexed bitstream into stream data of the respective signals.

An illustrative example of the standard is the MPEG (Moving Picture Coding Experts Group). This MPEG is an abbreviation of a research organization for storage of moving pictures by ISO/IEC JTC1/SC29 (International Organization for Standardization/International Electrotechnical Commission, Joint Technical Committee 1/Subcommittee 2). The MPEG 1 and MPEG 2 standards are ISO11172 and ISO13818, respectively. Among these international standards, there are items ISO11172-1 and ISO13818-1 for multi-media multiplexing, items ISO11172-2 and ISO13818-2 for pictures and items ISO11172-3 and ISO13818-3 for speech.

FIG.1 shows a schematic structure of an apparatus for compressing picture signals using the international standards ISO11172-2 or ISO13818-2 or compressing acoustic signals using the international standards ISO11172-3 or ISO13818-3 for generating digital stream data, multiplexing these data and demultiplexing the multiplexed data into respective stream data.

Referring to FIG.1, video data 100, audio data 101 and other data 102 are supplied to associated encoders, namely a video encoder 103, an audio encoder 104 and an other encoder 105, respectively, for producing encoded stream data, herein termed elementary streams 106, 107 and 108. The multiplexer (MUX) 106 multiplexes these elementary streams for generating a unified stream data, herein termed a multiplexed stream 110. In a method specified by the MPEG1 or MPEG2, the synchronization information of the picture or acoustic signals with resect to the time axis are simultaneously recorded as the subsidiary information in a multiplexed stream. This multiplexed stream 112 is sent over a recording medium 111 or a transmission medium to the receiver.

In the receiver, the multiplexed stream 112 enters a demultiplexer (DEMUX) 113. The demultiplexer separates the elementary streams from one another while the relation of synchronization is kept. The elementary streams, thus separated, enter the associated decoders, namely the video decoder 117, audio decoder 110 and the other decoder 119 to generate a video signal 120, an audio signal 118 and an other signal 122 by a display device, such as a monitor or a speaker.

Referring to FIG. 2, the demultiplexing method specified in the International Standards ISO11172-1 or 13818-1 for multimedia multiplexing, such as MPEG1 or MPEG2, is explained. The demultiplexing method shown in FIG. 2 uses an idealized decoder and is termed a system target decoder (STD) model.

The multiplexed stream supplied to an input terminal 131 of the model shown in FIG. 2 is obtained on time divisionally multiplexing the elementary streams supplied to the decoders. The data obtained on time divisional multiplexing by a changeover switch 132 of FIG. 2, corresponding to the above-described separator, are sent to associated buffers, that is a video buffer 141, audio buffers 142, 143, . . . and an other buffer 144 of a video decoder 135, several audio decoders 136, 137, . . . and another decoder 138, respectively. The data read out from the video buffer 141 are sent to a video decoder 145, while data read out from the audio buffers 142, 143, . . . are sent to audio decoders 146, 147, . . . and data read out from the other buffer 144 are sent to the other decoder 148. If the data from the video decoder 145 is an I-picture (intra-frame coded picture) or a P-picture (forward predictively coded picture), it is sent via a re-arraying buffer 149 to one of fixed terminals of a changeover switch 150. If the data from the video decoder 145 is a B-picture (backward predictively coded picture), it is sent to the other fixed terminal of the changeover switch 150. An output of the changeover switch 150 is taken out at a terminal 151 while outputs of the audio decoders 136, 137 are taken out at terminals 152, 153, . . . , respectively.

The rate of delivery of the multiplexed stream to the changeover switch 132 as the separator is termed MUX__ rate. The value of MUX__ rate depends on the recording medium or the form of transmission and is stated in the multiplexed stream. Since the stream is multiplexed, data delivery from the separator to the buffers 141 to 144 associated with the respective elementary streams is intermittent and burst-like. In the present model, data delivery from the buffers 141 to 144 to the decoders 145 to 148 occurs instantaneously with an ideal data unit. That is, the delay time by transfer is zero. The decoding in each decoder also occurs simultaneously with this data unit, with the delay time for decoding being also zero. This ideal data unit is termed an accessing unit. This ideal data unit is an encoded picture or frame and an audio frame for video and audio, respectively.

The multiplexed streams prescribed in the above international standards ISO11172-1 or 13818-1 are generated by controlling the multiplexer by the encoder so as to prevent overflow or underflow in the buffers 141 to 144 in the present model, as will be explained subsequently. Specifically, the data bandwidth of data transmission, indicated by MUX__ rate, is shared by plural streams and utilized in a time-sharing fashion. The data are ultimately supplied via the buffers to the decoders 145 to 148 for display.

Also, since the subsidiary information called time stamp for maintaining the relation of synchronization for display is available from the multiplexed stream, the decoder uses this data for synchronization reproduction. For example, the international standards ISO11172-1 or 13818-1 for multimedia multiplexing prescribe time stamps called SCR (system clock reference), DTS (decoding time stamp) and PTS (presentation time stamp). The SCR is stated in the pack header, as later explained, while the DTS and the PTS are stated in the packet header, also as later explained. The SCR is the reference value owned by the STD model. This value is acted upon for reading the multiplexed stream in the decoder, or controlling the data input to each buffer. The DTS and the PTS, which can be stated from one accessing unit to another, denote the time of extraction and decoding of the associated accessing units from the respective buffers in the STD model, respectively. In the international standards ISO13818-3 and 11172-3 for speech signal compression, for example, since the PTS and the DTS are concurrent, only the value of PTS is stated on the multiplexed stream. In the international standards ISO13818-2 and 11172-2 for speech signal compression, for example, since it becomes necessary, after decoding by the decoder, to delay a picture depending on the arraying of pictures, such as I-picture preceding a B-picture, it may be an occurrence that the DTS differs from the PTS. In such case, both time stamps are stated on the multiplexed stream.

FIG. 3 shows the structure of a multiplexed stream prescribed in the above international standards ISO13818-1 and 11172-1. The multiplexed stream is comprised of time-divisionally multiplexed elementary streams and is made up of plural packets PT. The individual packets PT are each composed of data of unitary elementary streams, while there is no possibility of co-existence of data of plural elementary streams. A packet header $H_{PT}$ is appended to each packet PT for specifying the information showing the contents of the packet and the aforementioned PTS and DTS. The size of the packet PT is usually variable and is stated in the packet header $H_{PT}$. The packet composed of video data and the packet composed of audio data are termed a video packet and an audio packet, respectively.

A number of the packets PT, collected together, are termed a pack PK. Each pack PK has the aforementioned pack header $H_{PK}$ and specifies the information such as SCR. As an example, the size of the pack PK is set depending on characteristics of the transmission medium. In a video CD, for example, each pack corresponds to a sector and is of a fixed length.

Referring to FIGS. 4 and 5, the method of controlling the data delivery to each buffer using the time stamp in the multiplexed stream and data outputting from each buffer from one accessing unit to another (data inputting to the decoder) is explained. This control method is merely an example in the ideal STD model and actual decoders do not necessarily execute the same operation.

FIG. 4 shows an example of a multiplexed stream made up of a video elementary stream and an audio elementary stream multiplexed together. For simplicity in explanation, it is assumed that a pack is formed for each packet. The video stream conforms to, for example, the above-mentioned international standard ISO13818-2 or ISO11172-2 and is encoded in the sequence of an I-picture (intra-coded picture), a B-picture (bidirectionally predictive-coded picture), a B-picture, and so forth. The respective pictures are termed a picture VF1, a picture VF2 and a picture VF3, and so forth. The sizes of the pictures are set to S1, S2, S3 and so forth. The audio stream shown conforms to, for example, the international standards ISO13818-3 or 11172-3 and is made up of plural audio frames (audio frame AF1, audio frame AF2 and so forth).

The multiplexed stream shown conforms to, for example, the multiplexed stream prescribed in the international standards ISO13818-1 or 11172-1. The pack header $H_{PK}$ in each pack PK states the above SCRs (SCR1, SCR2, SCR3, SCR4 and so forth, where SCR1<SCR2<SCR3<SCR4). The packet header $H_{PT_1}$ of the packet PT1 states the PTS and the DTS (PTS1 and DTS1) associated with the picture VF1 (I-picture), the packet header $H_{PT_2}$ of the packet PT2 states the PTS (PTS2) associated with the picture VF2 (B-picture) and the packet header $H_{PT_4}$ of the packet PT4 states the PTS (PTS4) associated with the picture VF3 (B-picture). The packet header $H_{PT_3}$ of the packet PT3 states the PTS (PTS3) associated with the audio frame AF1.

FIG. 5 shows changes in the amount of buffer occupation in the STD model for the bitstream of FIG. 4. The amount of change is controlled by the above-mentioned time stamp. In FIG. 5, H1, H2, H3, H4, W1, W2 and A1 denote the time width during which data delivery to the video buffer is stopped, so that there is no change in the amount of occupation, as will be explained in detail. Meanwhile, the description on the buffer for the audio stream shown in FIG. 4 is not made.

At an arbitrary time point, the multiplexed stream starts to be read into the decoder at a transfer rate of MUX_ rate. H1 shows the time during which each header of the pack PK1 and the packet PT1 of the multiplexed stream is read. During this time, data delivery to the video buffer is stopped. When the first SCR (SCR1) stated in the pack header $H_{PK_1}$ is read from the multiplexed stream, the reference clock in the STD model (termed STC) is reset the value of the SCR1. The STC is then counted up at a pre-set period. Subsequently, the remaining data in the pack header $H_{PK}$ downstream of SCR1 and subsequent packet headers $H_{PT}$ are read at the same transfer rate MUX_ rate. Directly after reading the packet header $H_{PT}$, data input to the video buffer is started at the same transfer rate MUX_ rate. The rightwardly rising straight line denotes the state in which data is being supplied to the video buffer, with the gradient depicting the transfer rate (MUX_ rate). Data transfer to the video buffer is continued until the entire video data in the packet has been read out. Readout of the pack header $H_{PK_2}$ in the pack PK2 is then started. This readout is continued until the value of the SCR2 stated in the header is read out.

When the SCR2 is read, it is compared to the counted-up value of the STC, and the readout of the multiplexed stream is stopped until the STC value becomes equal to the SCR2 value. W1 denotes the time period during which the data delivery is stopped. When the STC subsequently becomes equal to the value of SCR2, readout of the remaining data downstream of SCR2 and the following packet headers in the H2 period is performed at the MUX_ rate transfer rate. Directly after the packet header data is read, data delivery to the video buffer is re-started at the MUX_ rate transfer rate. Subsequently, the same sequence of operations is repeated.

The data delivery to the buffer for each elementary stream is controlled in accordance with the SCR stated on the multiplexed stream, as described above. That is, data delivery is not made to any buffer until the value of the reference clock STC becomes equal to the value of the current SCR. From the side of the multiplexer, this may be summarized such that, if there is no necessity of data delivery, it suffices to insert a pack header and to state the time of re-starting data delivery as the SCR value.

The time width A1 in FIG. 5 denotes the time period during which the packet PT3 (audio packet) in the pack PK3 is read. During this time, data transfer to the audio buffer occurs at the same transfer rate MUX_ rate. Thus, there is no data delivery to the video buffer during the time period A1, such that no change is caused in the amount of occupation. Meanwhile, when the STC becomes equal to the value of DTS1, the accessing unit of the size S1 associated with DTS1 (picture VF1) is instantly extracted from the video buffer and transferred to the decoder. FIG. 12 shows an instance for SCR4<DTS1. The pictures VF2 and VF3 are also instantly extracted from the video buffer at time points PTS2 and PTS3 by similar control. Although input/output control of the video buffer in the STD model has been described above, each buffer associated with audio or multiplexed other stream data is controlled in a similar manner.

As described above, the time stamp is the crucial information used for input/output control in each buffer. Thus, if the time stamps are not stated with proper values on the multiplexed stream on each stream data time-shared to a suitable length, buffer management cannot be done correctly. An instance in which buffer management becomes broken due to inappropriate time stamps is hereinafter explained. In FIG. 5, the time DTS1 denotes the time of extraction of the picture VF1 of size S1. If, on the multiplexed stream, the time DTS1 is smaller than the value of SCR2, the picture VF1 cannot be extracted at time DTS1, since an amount of data sufficient for extraction (S1) is not supplied to the video buffer unit time DTS1. This state of the buffer is termed underflow in the buffer.

On the other hand, if the value of the time DTS1 is sufficiently larger than the value of SCR4, the picture VF1 is not extracted at a proper time and, moreover, data is supplied during such time to the buffer, so that, at a certain time point, the amount of occupation of the buffer exceeds the allowable amount of the buffer (Buffer__ Size in the drawing). This state of the buffer is termed overflow in the buffer.

With the multiplexer, each elementary stream needs to be time-divisionally multiplexed with a suitable length, while proper time stamp values need to be set on the multiplexed stream, for possibly preventing breakage in the buffer in the decoder, such as overflow or underflow.

In general, video, audio or other elementary streams to be multiplexed are independently encoded prior to multiplexing. For example, in video encoding according to the above-mentioned international standards ISO13818-2 or 11172-2, a buffer model different from the STD model is prescribed, and a video stream according to this model can be decoded and displayed at a proper time interval in a sole video decoder. The scheduling for multiplexing is governed by these buffer models in the decoder of the elementary streams. That is, the multiplexer is required to perform multiplexing in such a manner as to maintain proper matching to the buffer models of the individual elementary streams and synchronism of the elementary streams.

Referring to FIG. 6, the amounts of occupation of the buffer in the buffer model of the elementary stream and the above-mentioned STD model is explained. In the present instance, multiplexing of a sole video stream and a sole audio stream is explained. It is assumed that the video and audio streams have been encoded in accordance with, for example, the aforementioned international standards ISO13818-2 and 11172-2 and ISO13818-3 or 11172-3, respectively. In the following description, a buffer in the STD model is termed an STD buffer for avoiding confusion. Also, in the present instance, the time required for transmission of data on the multiplexed streams, such as pack headers and packet headers, is disregarded and not shown. FIGS. 6A and 6B show instances of an audio STD buffer models and a video STD buffer model, respectively.

First, a serrated curve (a) in FIG. 6B shows the state of occupation of a buffer in video buffer verifier (VBV) prescribed in the above-mentioned international standards ISO13818-2 and 11172-2, that is a buffer in an ideal sole video decoder (termed a VBV buffer). In this figure, a rightwardly rising curve denotes data delivery to the VBV buffer. The rate of change is fixed, so that the inclination of change is constant. At an arbitrary time point, encoded video data starts to be supplied to the VBV video buffer. After lapse of a time of VBV__ delay shown in FIG. 6, encoded video data of the first display unit (picture I2) is instantly extracted from the VBV buffer and decoded. That is, there is zero delay in picture extraction and decoding. The above operation is repeated for the values VBV__ delay for respective pictures. The amount of occupation in each VBV buffer delineates a serrated line as shown at (a) in FIG. 6B. In the above referenced international standards ISO13818-2 and ISO11172-2, the values of VBV__ delay are set for individual pictures and stated in each encoded picture.

Meanwhile, in the STD buffer associated with each elementary stream, since the multiplexed data is time-divisionally multiplexed, as above explained, data delivery occurs in a burst fashion. The trajectory of the video STD buffer is shown by a polygonal line or curve (b) in FIG. 6B. The data delivery to the video STD buffer is indicated by a rightwardly rising curve, with the rate (inclination) being MUX__ rate. If data is supplied to an STD buffer for an elementary stream other than the video elementary stream, data delivery to the video STD buffer ceases, so that the inclination becomes flat.

As shown above, the trajectory of the occupied amount of the video STD buffer need not be coincident with that of the VBV buffer. However, since the time interval in extraction and decoding of each picture is pre-set by, for example, the value of VBV__ delay, the time tamp needs to be correspondingly set in the video STD model. Moreover, since the size of the extracted picture in the VBV model is pre-set, multiplexing needs to be scheduled in the video STD model so that the smallest possible amount of data of the size will be supplied to the video STD buffer until extraction of each accessing unit (picture). Consequently, the trajectory of the amount of occupation of the video STD buffer lies above the trajectory of the amount of occupation of the VBV video buffer.

The time of cessation of data delivery to the video STD buffer means the time of data delivery to the audio STD buffer. FIG. 6A shows the amount of occupation of the audio STD buffer.

For example, in the audio encoding system of the above-mentioned international standards ISO11172-3 and 11172-3, buffer models, such as VBV models, are not prescribed. It is assumed here that the audio stream is supplied at a constant transfer rate to a buffer owned by the sole audio decoder, termed an A-buffer, so as to be instantly extracted at a constant time interval on the audio frame basis and instantly decoded. In this case, the capacity of the A-buffer is set so as to be at least larger than the length of each audio frame. In FIG. 6A, a polygonal line or a curve (c) in the graph of FIG. 6A shows changes in the occupied amount in the A-buffer. Since the audio stream is extracted at a pre-set time interval on the audio frame basis and decoded, the buffer capacity delineates a serrated curve.

On the other hand, data delivery to the audio STD buffer is as shown by the polygonal line or a curve (d) in the graph of FIG. 6A. The data transfer rate to the audio STD buffer is MUX rate. The accessing unit (audio frame) is removed by instant extraction from the audio accessing unit and decoded instantly. In the present instance, the audio accessing unit is assumed to be sufficiently small and the accessing unit is assumed to be removed from the STD buffer at a constant rate. For the same reason as that for the video STD buffer, the occupied amount of the audio STD buffer delineates a trajectory that is not coincident with the encoding model of the sole video decoder (model of the A-buffer).

In FIG. 6, domains (e), (f) and (g) denote data delivery domains to the audio STD buffer and to the video STD buffer and data delivery stop domains for both the audio STD buffer and the video STD buffer.

The above instance is directed to multiplexing of each one video stream and audio stream. However, plural audio streams can be handled in actual application. In such case, data delivery scheduling in multiplexing, taking into account the encoding model for respective elementary streams, becomes more complex.

Multiplexing means time-sharing multiplexing of plural elementary streams into a unified data stream. However, the above-mentioned STD scheduling becomes broken under certain scheduling, as will be explained by referring to FIG. 7.

FIG. 7 shows multiplexing of a sole video stream V and two audio streams (a first audio stream A1 and a second audio stream A2). Each graph in FIG. 7 denotes time changes of the occupied amounts of the STD buffers for the respective elementary streams. Specifically, FIGS. 7A, 7B and 7C show the occupied amounts of the STD buffers for the first audio stream A1, second audio stream A2 and the video stream V, respectively.

In FIG. 7, $T_{n-2}$, $T_{n-1}$ and $T_n$ denote the extraction time points of (n−2)th, (n−1)th and nth accessing units or pictures $A_{n-2}$, $A_{n-1}$ and $A_n$, respectively. In the instant case, the extraction time intervals ($W_{n-1}$, $W_n$, and so forth) of the video accessing units are data delivery unit time intervals. That is, the data delivery scheduling is determined from one unit time interval to another. Specifically, one or more of STD buffers, to which data should be supplied during the time $W_{n-1}$ since time $T_{n-1}$ until time $T_n$ is selected at a time $T_{n-1}$, taking into account the data outputting state from all of the STD buffers that is likely to occur since time $T_{n-1}$ until time $T_n$, and the amounts of occupation are adjusted accordingly. This unit time corresponds to 1/29.97 second and to 1/25 second in NTSC and in PAL, respectively. FIG. 14 shows a case in which the video STD buffer has become broken at time $T_n$ as a result of the above scheduling, as now explained in detail.

At time $T_{n-1}$ in FIG. 7, data delivery to the video STD buffer is started, taking into account the extraction of the video accessing unit at the next time point $T_n$. However, since the STD buffers for the two audio streams are likely to underflow substantially simultaneously at points (a) and (b) in FIG. 7, data delivery is switched to that for the audio STD buffers. During this time interval, data delivery to the video STD buffer ceases. That is, the first audio stream A1 and the second audio stream are supplied at the domains (c) and (d), respectively. After sufficient amounts of data have been supplied to the audio STD buffers, data delivery is again made to the video STD buffer. However, since sufficient data is not supplied up to time $T_n$, buffer underflow occurs at a time instant the next video accessing unit $A_n$ is extracted, as shown at point (e) in FIG. 7. Also, since the video buffer is ruptured in this manner, buffer underflow occurs in portions (f) and (g) in FIG. 7 for the first and second audio streams A1 and A2, respectively.

In the instant case, data delivery scheduling to the respective STD buffers is set based on the extraction time points of the respective video accessing units. That is, a pre-readable portion (h) of an accessing unit is used as one video accessing unit. In the instant case, the video STD buffer is ruptured because the sum of data supply rates required for the STD buffers in this unit time has exceeded the total data delivery rate, or MUX_ rate. The reason is that, because of the shorter unit time in scheduling, the transmission band cannot be allocated appropriately should data delivery to many STDs be requested during such time.

FIGS. 8A to 8C show an instance in which the scheduling unit time in the data delivery is set so as to be longer than in the above case. In the case of FIG. 8, data delivery to the STD buffers is based on the extraction time of two video accessing units. That is, the pre-readable portion (a) of the accessing unit corresponds to two video accessing units. Specifically, one or more of STD buffers, to which data should be supplied during the time $W_x$ since time $T_{n-2}$ until time $T_n$, is selected at a time $T_{n-2}$, taking into account the data outputting state from all of the STD buffers that is likely to occur since time $T_{n-2}$ until time $T_n$, and the amounts of occupation are adjusted accordingly. As compared to the case of FIG. 7, the data delivery timing to the STD buffer of the audio D2 is intentionally set backtime, that is set to a temporally previous time point, for thereby evading rupture of each STD buffer. The domains (b) and (c) in FIG. 8 denote the data delivery domains to the second audio STD buffer A2 and to the first STD audio buffer A1, respectively.

As discussed in the foregoing, rupture of the STD buffers can be evaded to some extent by setting the processing unit time in the multiplexing data delivery scheduling so as to be longer for taking into account the phenomenon occurring temporally subsequently to the current time. However, the above-mentioned international standards ISO13818-1 and 11172-1 allow for multiplexing of up to 32 audio streams at the maximum. In such case, it is extremely difficult to schedule STD model multiplexing for evading the buffer rupture under any circumstances. That is, in the above-described method in which the processing unit time is finite, there perpetually exists the possibility of rupturing the STD model in deciding the data delivery schedule, such that it is impossible to assure completely safe multiplexing.

SUMMARY OF THE INVENTION

It is therefore a object of the present invention to provide a method and apparatus in which, in multiplexing plural elementary streams, a data delivery schedule can be determined easily for effectively preventing the buffers from being ruptured.

It is another object of the present invention to provide a digital signal recording medium on which has been recorded a multiplexed signal in such a manner as to prevent buffer rupture from occurring.

The present invention provides a multiplexing/demultiplexing method in which plural input stream data of digital signals are multiplexed in a pre-set manner and recorded on a recording medium or transmitted over a transmission network, and in which the multiplexed signals are demultiplexed and original signals such as picture or speech signals are synchronously reproduced. Specifically, from the input plural bitstreams, the time point of extracting each accessing unit, as a processing unit prescribed from bitstream to bitstream, from a buffer of an associated decoder, is computed, the delivery start time to the buffer of each accessing unit is back-computed by processing proceeding in a temporally retrogressive direction, using data of the extraction time of each accessing unit. Charging of the accessing unit to the buffer is read for extraction of the accessing unit from the decoder buffer, and the scheduling for packetization of the accessing units is determined based on the thus computed delivery start time of the accessing units to the buffer.

By scheduling data delivery of each elementary stream to he decoder buffer in a temporally retrogressive direction, based on the size of each accessing unit, advance scheduling of data delivery becomes possible to a theoretically infinite extent. Thus, in multiplexing plural elementary streams, data delivery can be scheduled easily, thus assuring safe multiplexing free from buffer rupture. If it is desired to multiplex a large number of streams, the degree of freedom in data scheduling is broader to assure more safe and efficient multiplexing with reduced overhead.

BRIEF DESCRIPTION OF THE DRAWINGS

FIGS. 8A, 8B and 8C illustrate specified examples of changes in the occupied amounts of the STD buffer in case he pre-reading range for multiplexing scheduling is increased for preventing buffer rupture from occurring.

DESCRIPTION OF THE PREFERRED EMBODIMENT

Figure 1:
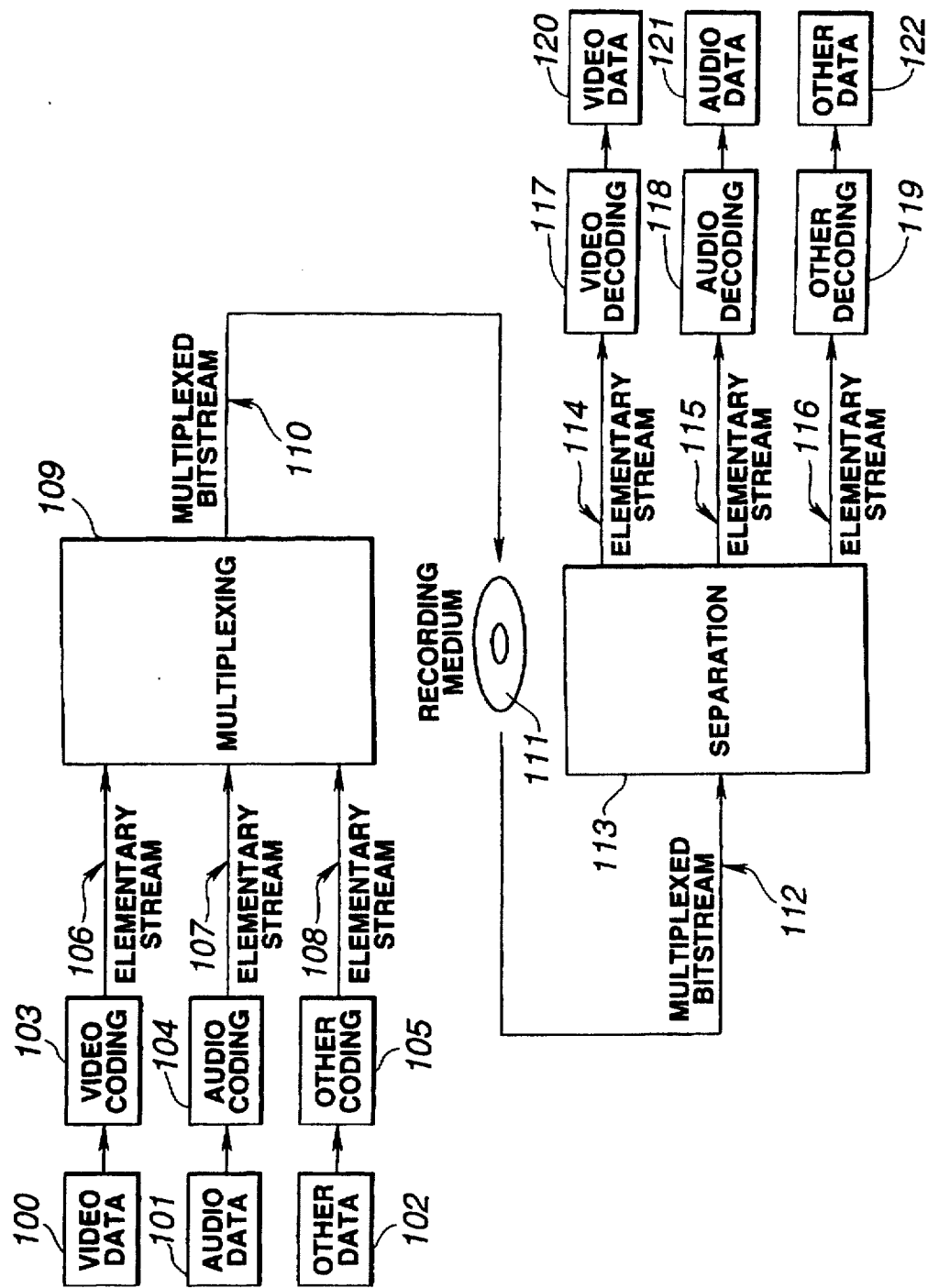
FIG. 1 illustrates multiplexing of elementary streams.
Figure 2:
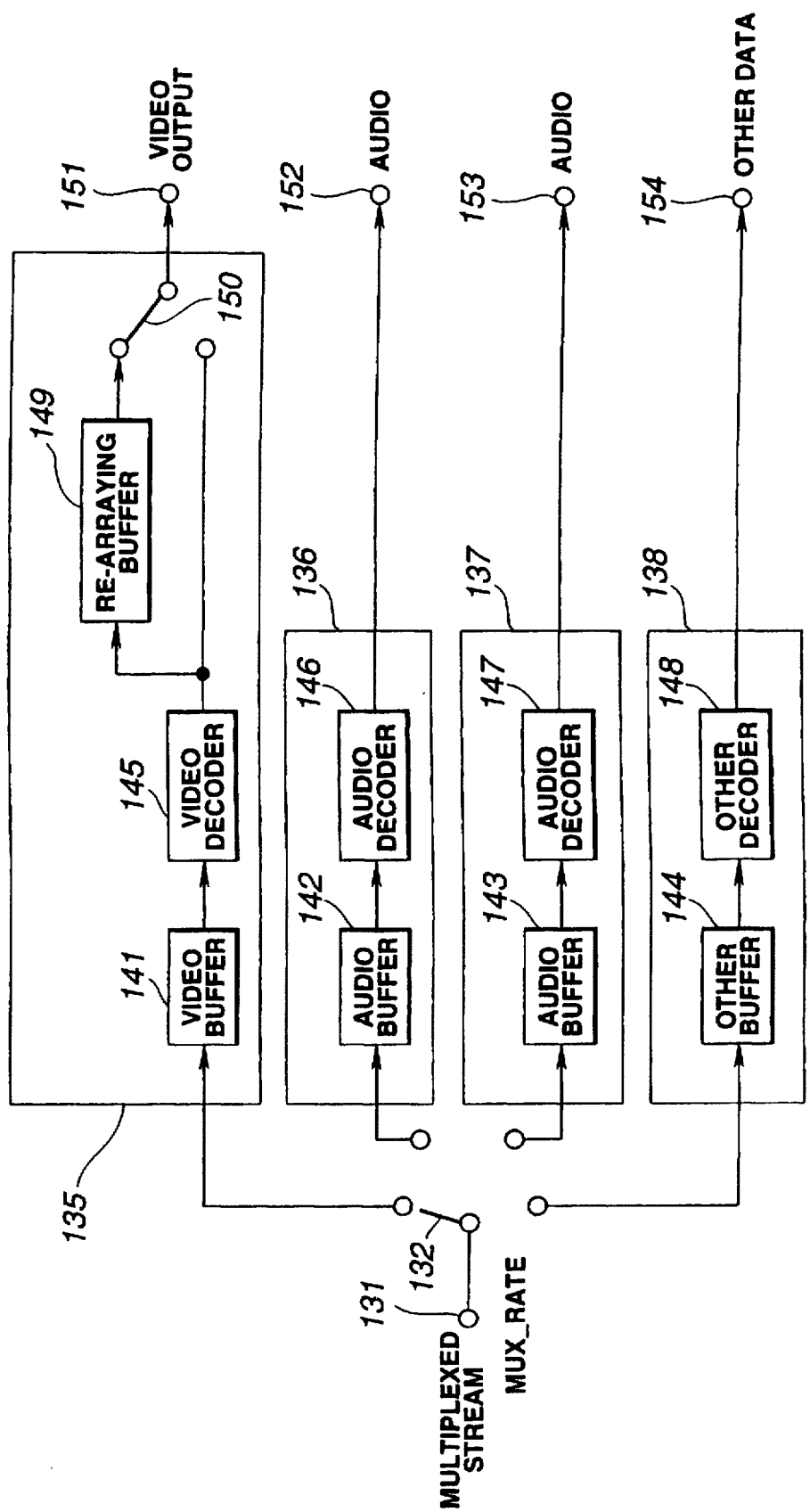
FIG. 2 illustrates an instance of an STD buffer model.
Figure 3:
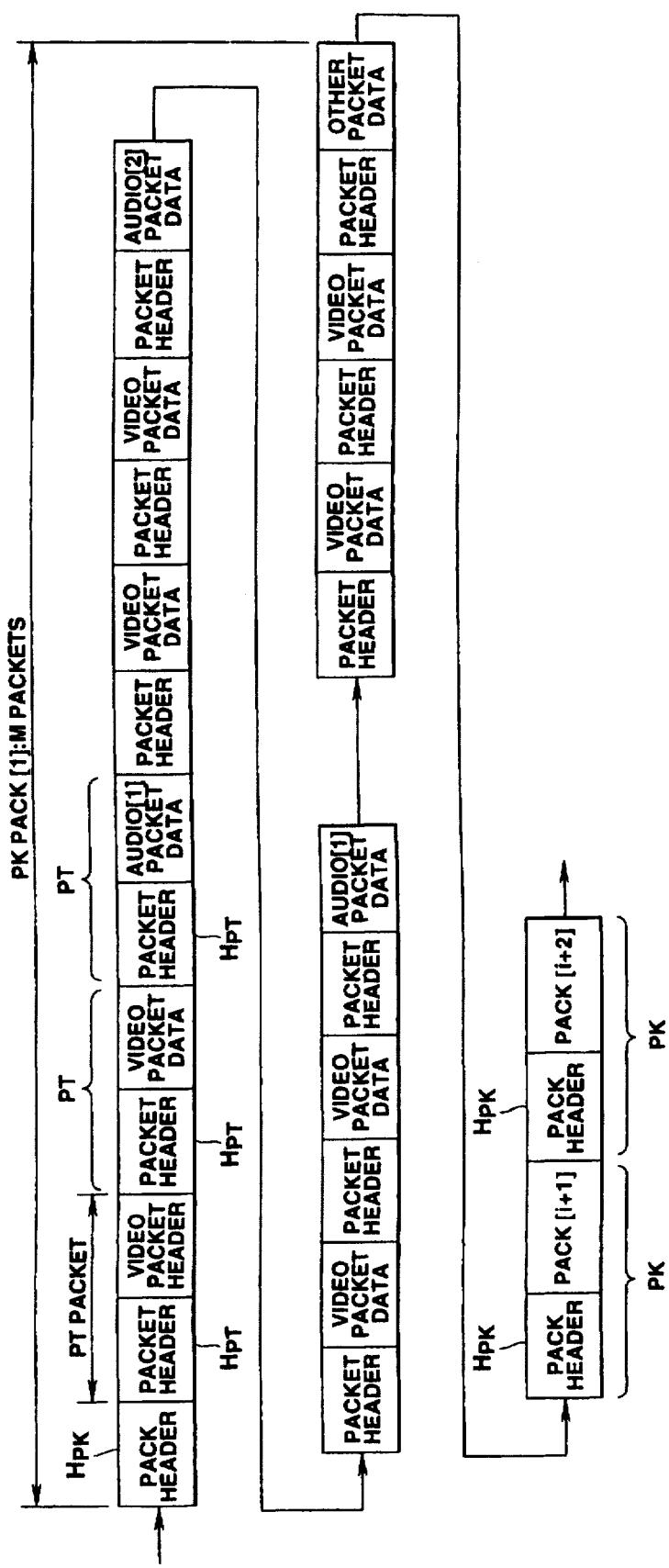
FIG. 3 illustrates the structure of a multiplexed stream.
Figure 4:
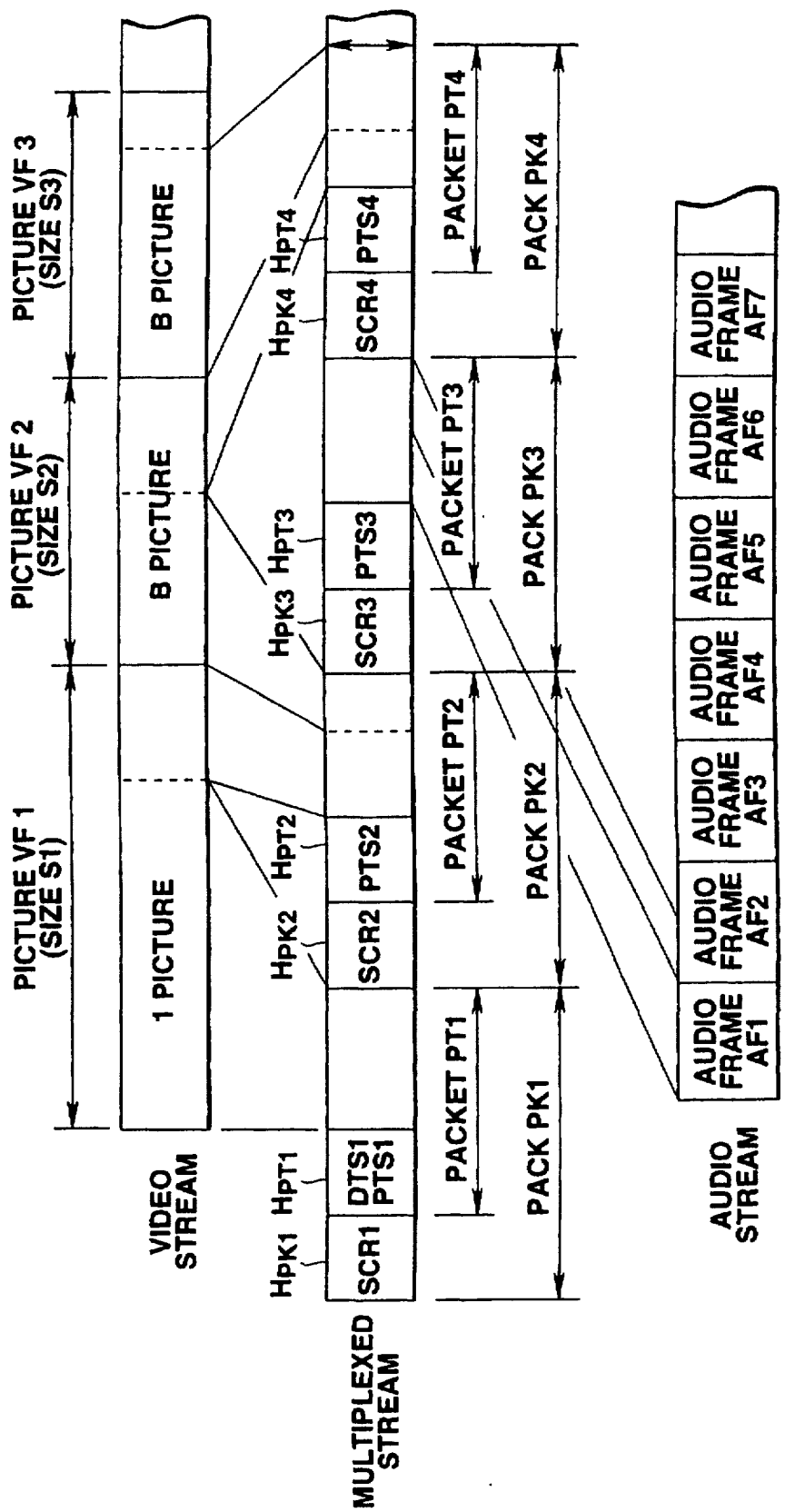
FIG. 4 illustrates an example of an input multiplexed stream for explanation control of the buffer data input/output by time stamps.

Referring to the drawings, preferred embodiments of the present invention will be explained n detail.

Figure 9:
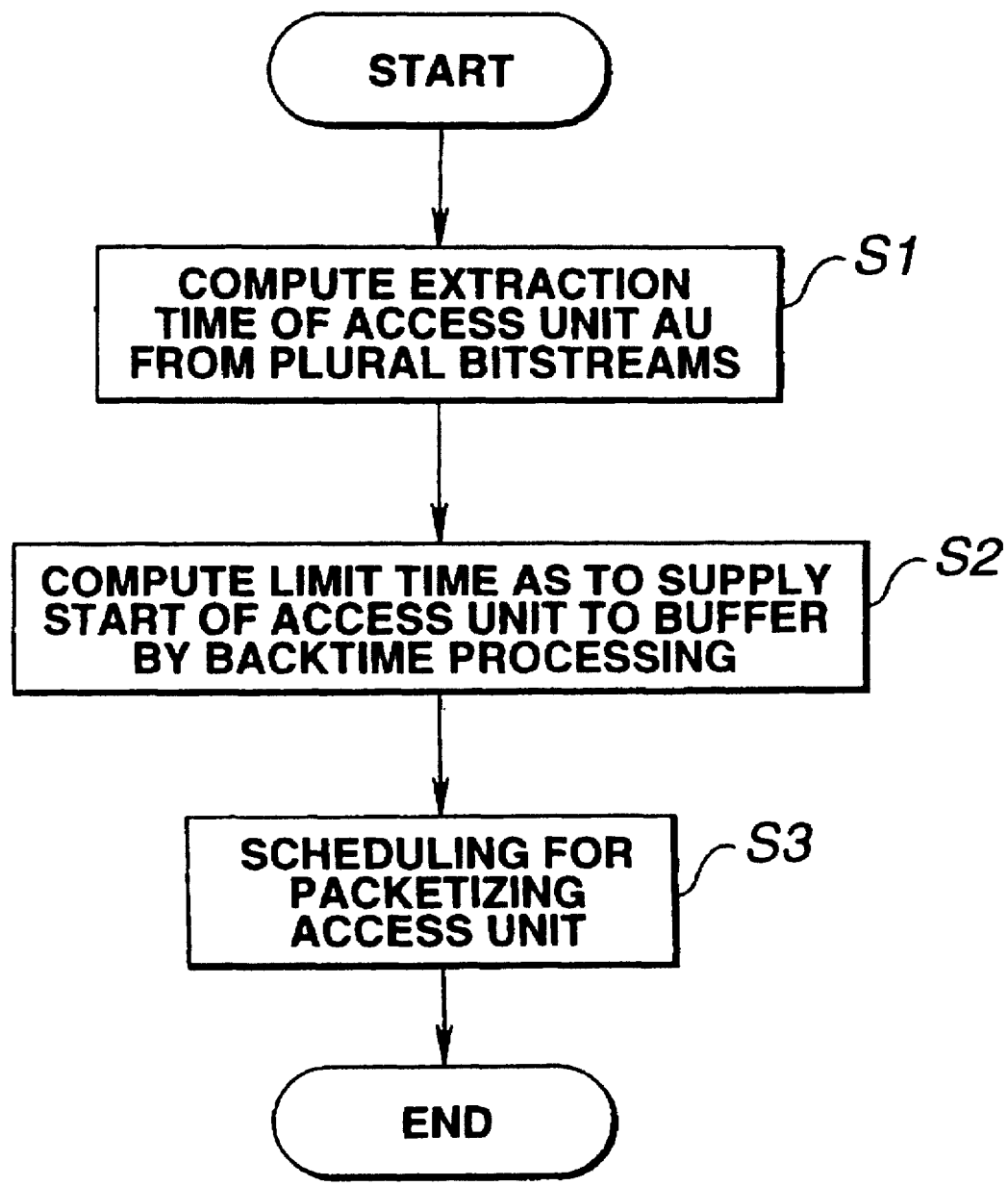
FIG. 9 is a flowchart for illustrating an embodiment of the digital signal multiplexing method according to the present invention.

In a flowchart of FIG. 9, there is shown a method for multiplexing digital signals of multiplexing input plural bitstreams of digital signals for generating a multiplexed bitstream according to the present invention.

At a first step S1 of FIG. 9, the time of extracting each accessing unit AU, which is a processing unit prescribed from one bitstream to another, from a buffer of an associated decoder, is computed. The accessing unit AU is an ideal data unit used for transferring data from the buffer to the decoder, and is a picture or a frame in video signals and an audio frame in an audio signal.

At the next step S2, the constraint time concerning the delivery start time to the buffer of each accessing unit, is back-computed by processing proceeding in a temporally retrogressive direction, using the data of the extraction time of the accessing units AU, and by reading charging of the accessing units to the decoder buffers for the extraction of the accessing units from the decoder buffers.

At the next step S3, scheduling of packetizing the accessing units is determined on the basis of the constraint time as found at step S2, by way of performing the scheduling.

By such temporally reversed processing of multiplexing and scheduling, the degree of freedom in data scheduling is broader to assure more safe and efficient multiplexing with reduced overhead.

The basic concept of multiplexing in the temporally retrogressive direction according to the present invention is now explained. The following description is presupposed on performing the processing in which time retrogresses. The time is represented by clocks.

In multiplexing, data delivery scheduling to an STD buffer, based on the accessing unit, that is a picture or a frame in video signals and an audio frame in audio signals, as processing units, is basically executed based on the display time of each accessing unit (time of extraction of the accessing unit to the STD buffer) as a reference. Stated briefly, it suffices if data delivery to the STD buffer of each accessing unit is terminated on or before the display time of each accessing unit. That is, if data delivery is started in an advance fashion, safe multiplexing can be assured at all times. This means that, if processing is executed in a usual manner in a temporally forward direction, and a problem is raised in multiplexing, there arises the necessity of performing a back-tracking operation in a temporally retrogressing direction for modifying the multiplexing scheduling.

In general, the degree of freedom in multiplexing scheduling is realized by advance data delivery to the buffer. If processing is executed in the forward direction, the range of the back-tracking operation is limited by the pre-reading amount of the accessing unit, as explained with reference to FIG. 15.

In the multiplexing in the temporally retrogressive direction, the extraction time or the display time of each accessing unit is previously computed and the time axis is traced in the retrogressive direction for eliminating the necessity for back-tracking. By retrogressive processing, advance data delivery becomes limitless thus realizing safe multiplexing less susceptible to buffer rupture.

Figure 10:
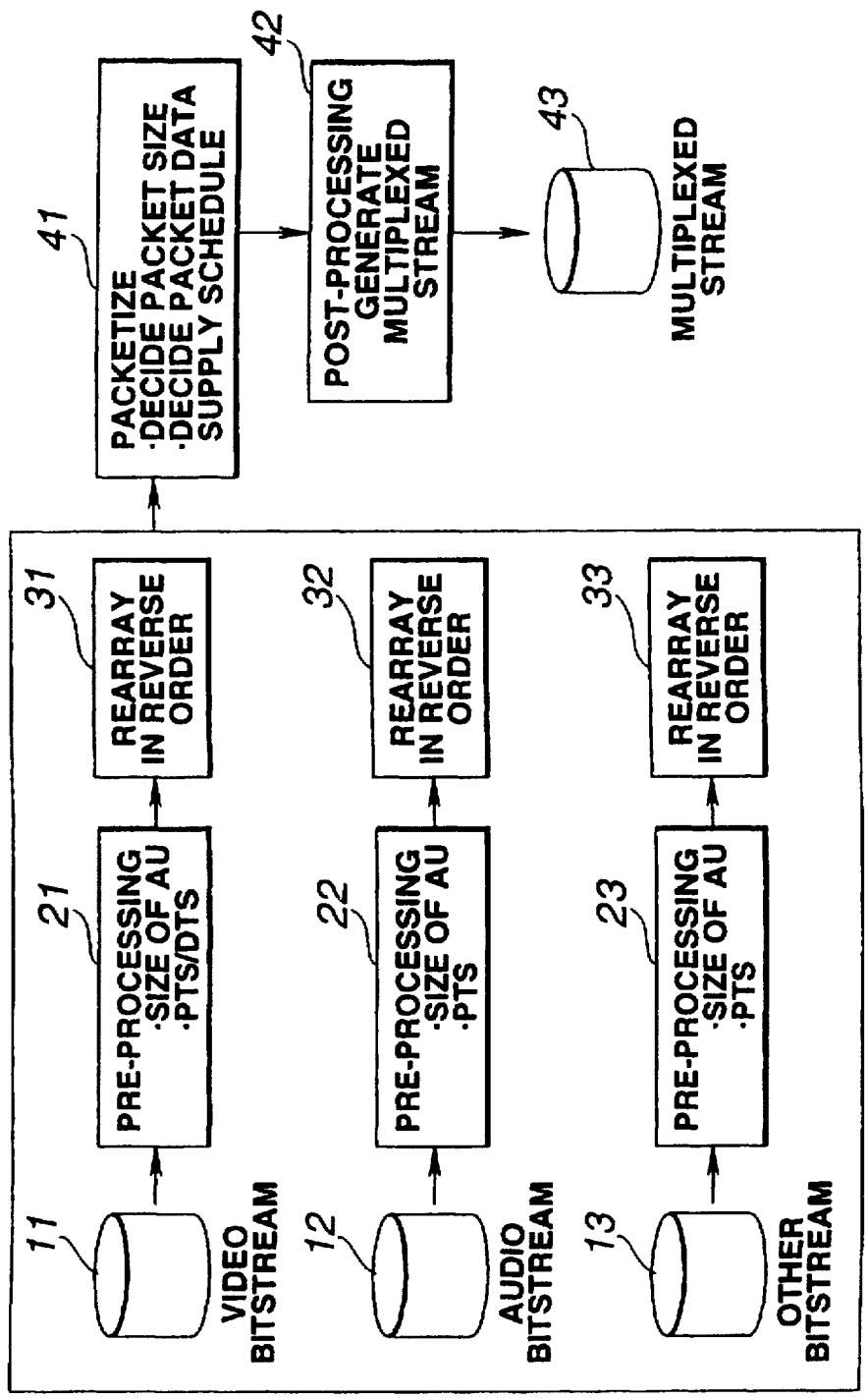
FIG. 10 is a schematic block diagram showing an embodiment of the digital signal multiplexing apparatus according to the present invention.

Referring to FIG. 10, schematically showing a processing flow for multiplexing in the reverse direction by a functional block diagram, a schematic structure for multiplexing in the reverse direction is hereinafter explained.

From storage media 11, 12, 13, on which have been recorded video/audio or other elementary streams, these streams are read out and sent to pre-processing units 21, 22, 23 where the sizes of the accessing units, PTS or DTS are calculated for formulating the corresponding data. Since the subsequent operations occur in the temporally retrogressive direction, all data are arrayed by re-arraying units 31, 32, 33. Based on these data, the packetization scheduling is determined by a packetizing unit 41. The packetization scheduling is determined by monitoring the amount of data occupying the STD buffer and by using a method which will not cause overflow/underflow in the buffer. An actually multiplexed stream is generated by a post-processor 42 based on the thus set schedule. This multiplexed stream is recorded on a storage medium or a recording medium 43, such as a magneto-optical disc or a magnetic tape.

The algorithm for multiplexing in the reverse direction is explained.

In the following description, basically the time stamp for decoding (decoding time stamp or DTS) is used for discussing the time of extraction from the buffer of the accessing unit. In the absence of the DTS, a time stamp for display or presentation (presentation time stamp or PTS) is used. The extraction of the accessing unit and the time of extraction are referred to hereinafter as an event and an event time, respectively.

In the following rule, AU(m, n) denotes an accessing unit, meaning an nth accessing unit in a mth elementary stream, where $0 \leq m \leq M$ and $0 \leq n \leq N$.

The algorithm of simulating the STD buffer in the temporally retrogressive direction for determining the timing of data delivery to the decoder buffer is now explained.

First, as pre-processing, the size of the accessing unit and the event time need to be set.

For previously calculating the time of extraction of all of the accessing units AU(m, n), the following processing is performed for each of the elementary streams. That is, from the information of Video: The size of each accessing unit and the event time corresponding to DTS (PTS in the absence of DTS) of each accessing unit;

Audio: The size of each accessing unit and the event time of each accessing unit (PTS); and Others: The size of each accessing unit and the event time of each accessing unit (PTS), all event time points are calculated. It should be noted that the event time for the accessing unit AU(m, n) is expressed by T__ event__ AU(m, n) for indicating the trigger time for all packetizing processing of the following accessing units AU(m, n).

The size and the event time of each accessing unit, prepared as described above, are recorded on the elementary stream basis in a form shown in FIG. 10. For carrying out the subsequent operations in a temporally retrogressive direction, data are arrayed in a reverse sequence in terms of the event time points. The subsequent operations occur on the basis of these data. The data delivery scheduling is then performed under the constraints now explained.

First, the relation between the STD model and the VBV model is explained. This relation is that between the trajectories of the occupied amounts of the buffers in the STD model and the VBV model.

Rule 0: The trajectory of the occupied amounts of the STD model needs to be perpetually at a higher position than (that is larger in value) than that of the VBV model.

As discussed above, the VBV model denotes the occupied amount of the buffer in the sole video decoder. On the other hand, the STD model denotes the occupied amount of the buffer when a stream is multiplexed with another stream, that is signifies that, if the trajectory of the STD model is low-like data delivery is produced. Consequently, the trajectory of the occupied amount of the STD buffer needs to be higher in its position than that of the VBV buffer. That is, the occupied amount of the STD buffer at an arbitrary time point needs to be larger than that of the VBV buffer. Although the video stream has been described above, multiplexing for other elementary streams needs to be performed so that the occupied amount of the buffer will not be smaller than that of the buffer model in the decoder, that is so that no underflow will be produced in the buffer.

Next, the constraint condition of T__ last__ byte__ AU(m, n), as an input time point to the STD buffer of the last byte of the last packet of the accessing unit AU(m, n), is explained.

Rule 1: The input time to the buffer of the last byte of the last packet of a given accessing unit AU(m, n) T__ last__ byte AU(m, n) needs to be supplied before the event time T__ event AU(m, n) of AU(m, n). That is, the following relation:

$$T\_\_ \text{last}\_\_ \text{byte}\_\_ AU(m, n) < T\_\_ \text{event}\_\_ AU(m, n) \quad (1)$$

should be met.

Rule 2: The input time to the buffer of the last byte of the last packet of a given accessing unit AU(m, n) T__ last__ byte AU(m, n) needs to be temporally before the input time to the buffer of the first byte of the first packet of the next accessing unit AU(m, n+1) T__ first__ byte__ AU(m, n+1). If the occupied amount of the buffer at the event time of the accessing unit AU(m, n) is Buffer occupancy AU(m, n), the following constraint condition:

$$T\_\_ \text{last}\_\_ \text{byte}\_\_ AU(m, n) < T\_\_ \text{event}\_\_ AU(m, n) - \text{Buffer}\_\_ \text{occupancy}\_\_ AU(m, n)/\text{MUX}\_\_ \text{rate} \quad (2)$$

is required.

If the conditions of the equations (1) and (2) shown by the rules R1 and R2 are observed, there is no buffer underflow otherwise caused by delay in arrival of the accessing unit AU(m, n).

Rule R3: In accordance with the MPEG rule, the last byte of the last packet of a given accessing unit AU(m, n) needs to be removed from the buffer within a second after the input time T last__ byte__ AU(m, n) to the buffer. Since the time of removal from the buffer is the event time of the accessing unit AU(m, n), it is given by:

$$T\_\_ \text{last}\_\_ \text{byte}\_\_ AU(m, n) > T\_\_ \text{event}\_\_ AU(m, n) - 1 \quad (3)$$

By previously finding T__ last__ byte__ AU(m, n) satisfying the above condition R3, safe retrogressive multiplexing in meeting with the 1-sec rule is assured.

Rule R4: If the inputting of the last byte of the last packet of a given accessing unit AU(m, n) is done in advance, buffer overflow is likely to be produced. The time limit in this regard is calculated by the equation:

$$\text{Overflow}\_\_ \text{limit}\_\_ \text{last}\_\_ \text{Byte}\_\_ AU(m, n) = T\_\_ \text{event}\_\_ AU(m, n) - (\text{Buffer}\_\_ \text{size}\_\_ AU(m, n)/\text{MUX}\_\_ \text{rate} \quad (4)$$

Therefore, the following constraint on the input time to the buffer of the last byte of the last packet of the accessing unit AU(m, n):

$$T\_\_ \text{last}\_\_ \text{byte}\_\_ AU(m, n) > \text{Overflow}\_\_ \text{limit}\_\_ \text{last}\_\_ \text{Byte}\_\_ AU(m, n) \quad (5)$$

is set.

Figure 11:
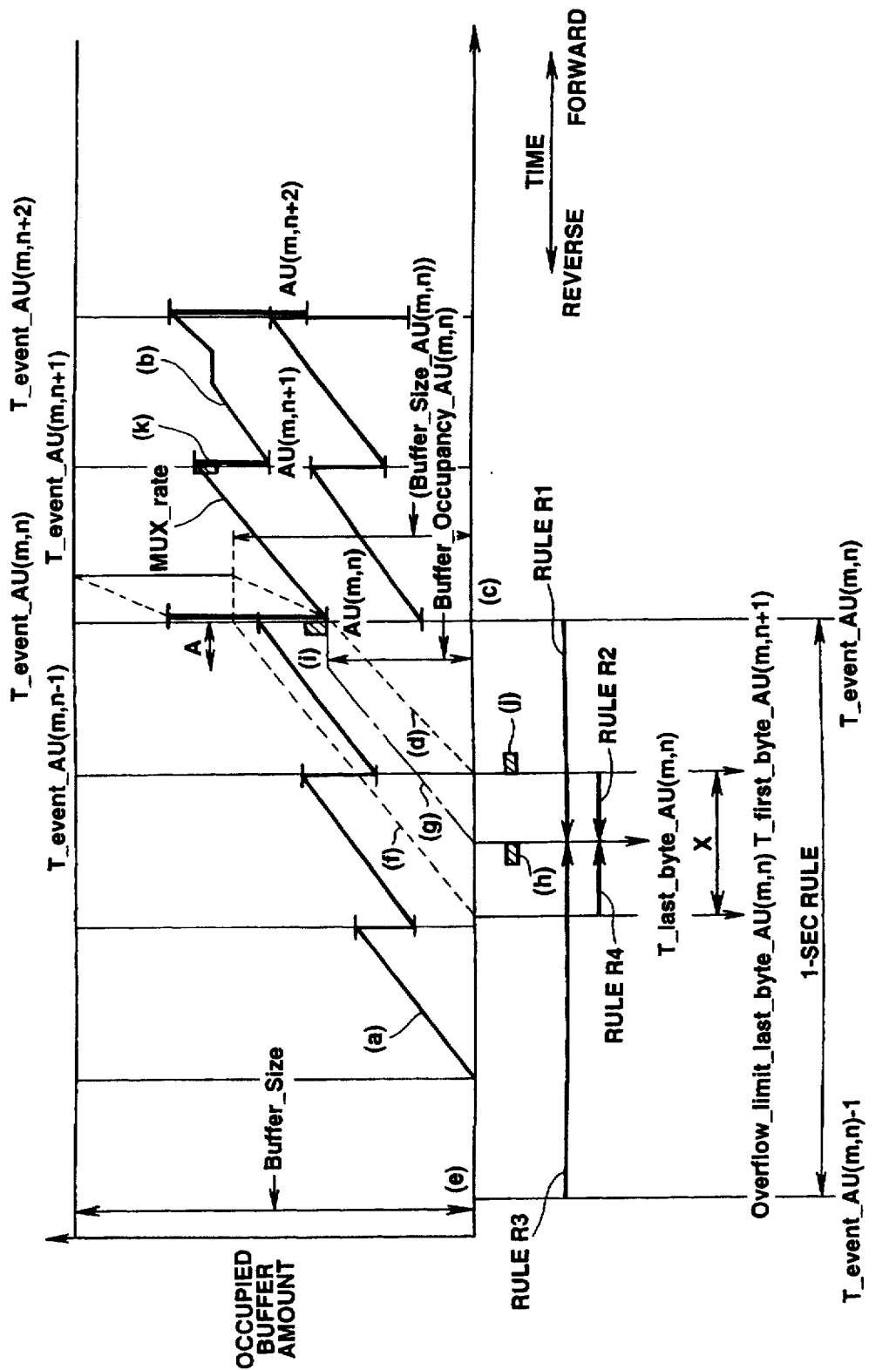
FIG. 11 illustrates limitations on the input time to a buffer of the last byte in the last packet of an arbitrary accessing unit A(m, n).

FIG. 11 illustrates the above rules R1, R2, R3 and R4. That is, this figure illustrates the conditions of the above rules concerning the time of multiplexing of the last byte in the last packet, that is the input time to the buffer T__ last__ byte__ AU(m, n), referred to the event time point of the accessing unit AU(m, n), if case of multiplexing, in the temporally retrogressive direction according to the above-mentioned system target decoder (STD) model, of the video data which has occurred in the positive time-axis direction in accordance with the video buffer verify (VBV) model. The time T__ last__ byte__ AU(m, n) shown in FIG. 11 is merely illustrative and may be arbitrarily selected within a time width X in FIG. 11.

In this figure, changes in the occupied amount of the buffer in the VBV model are shown by a polygonal line or a curve (a), whereas those in the occupied amount of the buffer in the STD model are shown by a polygonal line or a curve (b). Although the accessing units are extracted from the buffers in the two models at the same time, the extraction time points are shown with an offset for ease in understanding, as indicated by respective curves (a) and (b) at time point T__ event__ AU(m, n+2). The time (c) in FIG. 11 denotes the time point of T__ event__ AU(m, n) according to the rule R1. The time T__ last__ byte__ AU(m, n) needs to be set earlier than this time point on the time axis. A curve (d) illustrates the condition of the rule R2. Specifically, the curve (d) depicts how T__ first__ byte__ AU(m, n+1) is found from the occupied amount of the buffer Buffer__ Occupancy__ AU(m, n) at a time point T__ event__ AU(m, n). The gradient is MUX__ rate. The input time to the buffer of the last byte of the last packet of the accessing unit AU(m, n) needs to be set earlier on the time axis than the time point T__ first__ byte__ AU(m, n+1). The time (e) depicts the time one second earlier than the time T__ event__ AU(m, n) for illustrating the rule R3. The time T__ last__ byte__ AU(m, n) needs to be set temporally later than this time on the time axis. A curve (f) depicts the rule R4 and shows how Overflow__ limit__ last__ byte__ AU(m, n) for the accessing unit AU(m, n) is found. The gradient is MUX__ rate. The time T__ last__ byte__ AU(m, n) needs to be set temporally later on the time axis than Overflow__ limit A of the curve (g) denotes that data is supplied to an other stream, such as an audio stream, while data is not supplied to the video buffer.

In FIG. 11, (h) denotes an example of supply schedule to the buffer of the last byte of the last packet of the accessing unit AU(m, n), while (i) denotes the last byte of the last packet of the accessing unit AU(m, n). On the other hand, (j) and (k) in FIG. 11 show the data delivery schedule to the buffer of the first byte of the first packet of the accessing unit AU(m, n+1) and the first byte of the first packet of the accessing unit AU(m, n+1), respectively.

The constraint condition of the input time T__ first__ byte AU(m, n) to the STD buffer of the first byte of the first packet of the accessing unit AU(m, n) is now explained.

Rule 5: In accordance with the MPEG regulations, the first byte of the first packet of a given accessing unit AU(m, n) needs to be removed within one second since the same byte enters the buffer. Therefore, the input time T__ first__ byte__ AU(m, n) of the first byte of the first packet of the accessing unit AU(m, n) needs to be within one second as from the event time T__ event AU(m, n) of the accessing unit AU(m, n). That is, $$T\_\_ first\_\_ byte\_\_ AU(m, n) > T\_\_ event\_\_ AU(m, n)-1 \quad (6)$$

By finding the time T__ first__ byte__ AU(m, n), meeting the condition of R5 above, safe multiplexing in the retrogressive direction in keeping wit the 1-second rule is assured.

Rule 6: If the first byte of the first packet of a give accessing unit AU(m, n) is entered at too premature a timing, buffer overflow tends to be produced. The limit time Overflow__ limit__ first__ Byte__ AU(m, n) for which no such overflow is produced may be computed by $$Overflow\_\_ limit\_\_ first\_\_ Byte\_\_ AU(m, n) = T\_\_ event\_\_ AU(m, n)-Buffer\_\_ size/MUX\_\_ rate \quad (7)$$

Therefore, the following constraint condition:

$$T\_\_ first\_\_ byte\_\_ AU(m, n) > overflow\_\_ limit\_\_ first\_\_ Byte\_\_ AU(m, n) \quad (8)$$

is set for the input time to the buffer of the first byte of the first packet of the accessing unit AU(m, n).

Figure 12:
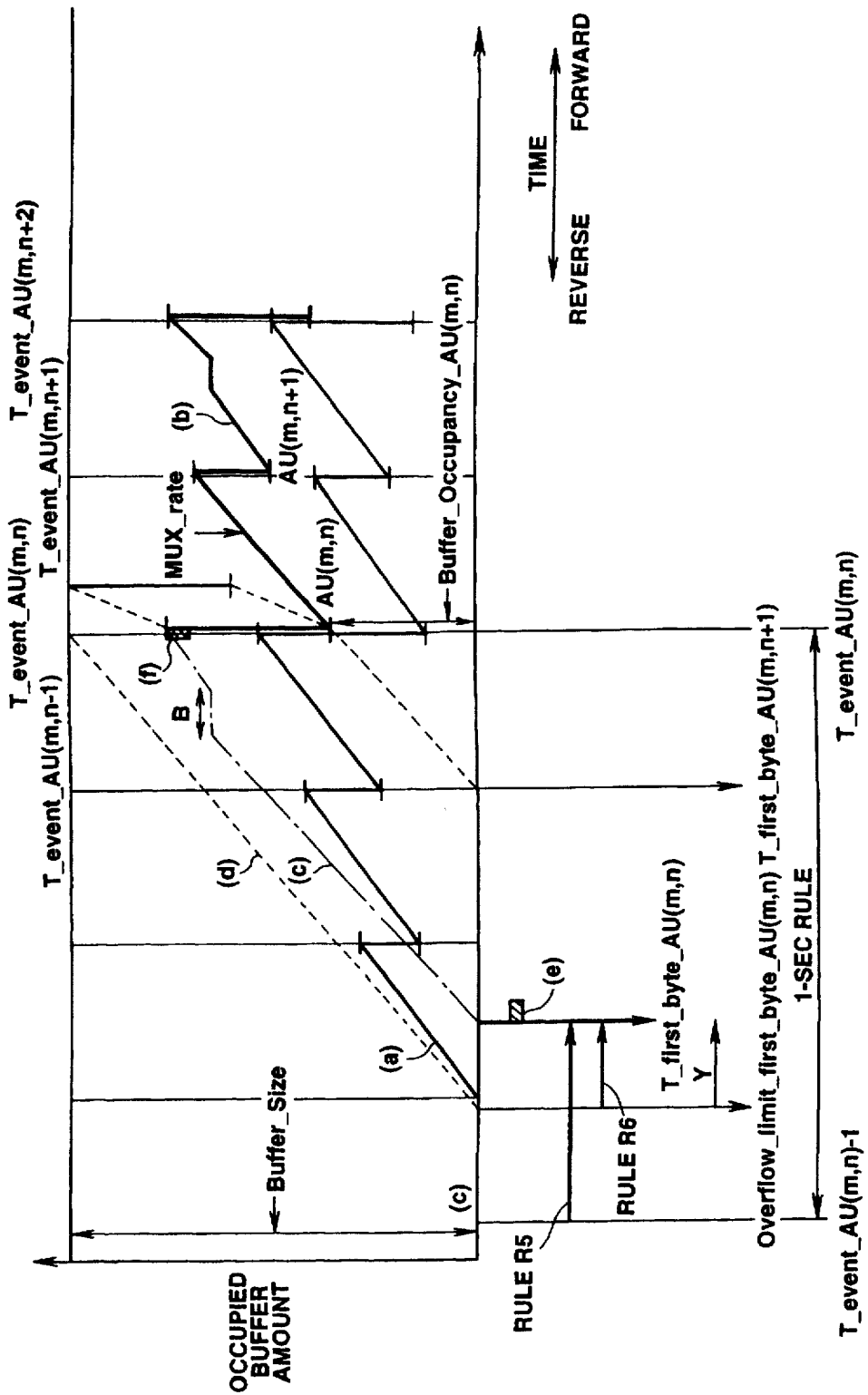
FIG. 12 illustrates limitations on the input time to a buffer of the first byte in the first packet of an arbitrary accessing unit A(m, n).

FIG. 12 illustrates the conditions of the above rules 5 and 6.

That is, FIG. 12 illustrates the conditions of the above rules R5 and R6 concerning the time of multiplexing of the first byte in the first packet, that is the input time T__ first__ byte AU(m, n) to the buffer, referred to the event time of a given accessing unit AU(m, n), in case of multiplexing in accordance with the STD model in the temporally retrogressive direction on the time axis of the video data generated in accordance with the VBV model in the positive direction of the time axis. The time T__ first__ byte__ AU(m, n) shown in FIG. 12 is merely illustrative and may be arbitrarily selected after time Y in FIG. 12. The time width B in FIG. 12 shows an example of supplying data to a buffer for another stream, such as an audio stream. During this time width, data delivery to the video buffer ceases.

In FIG. 12, changes in the occupied amount of the buffer in the VBV model are shown by a polygonal line or a curve (a), whereas those in the occupied amount of the buffer in the STD model are shown by a polygonal line or a curve (b). Although the accessing units are extracted from the buffers in the two models at the same time, the extraction time points are shown with an offset for ease in understanding, as indicated by respective curves (a) and (b) at time point T__ event__ AU(m, n+2). The time (c) in FIG. 12 denotes the time point onefirst__ byte__ AU(m, n) can be arbitrarily selected if posterior to the time point on the time axis. A curve (e) is an example of selection of T__ last byte__ AU(m, n) under the constraint of the time Y. A flat portion A of the curve (g) denotes that data is supplied to an other stream, such as an audio stream, while data is not supplied to the video buffer.

In FIG. 12, (e) denotes an example of data delivery schedule to the buffer of the first byte of the first packet of the accessing unit AU(m, n), while (f) denotes the first byte of the first packet of the accessing unit AU(m, n).

The data delivery scheduling for the accessing unit AU(m, n), taking into account the above-described constraint condition, is now explained.

Figure 13:
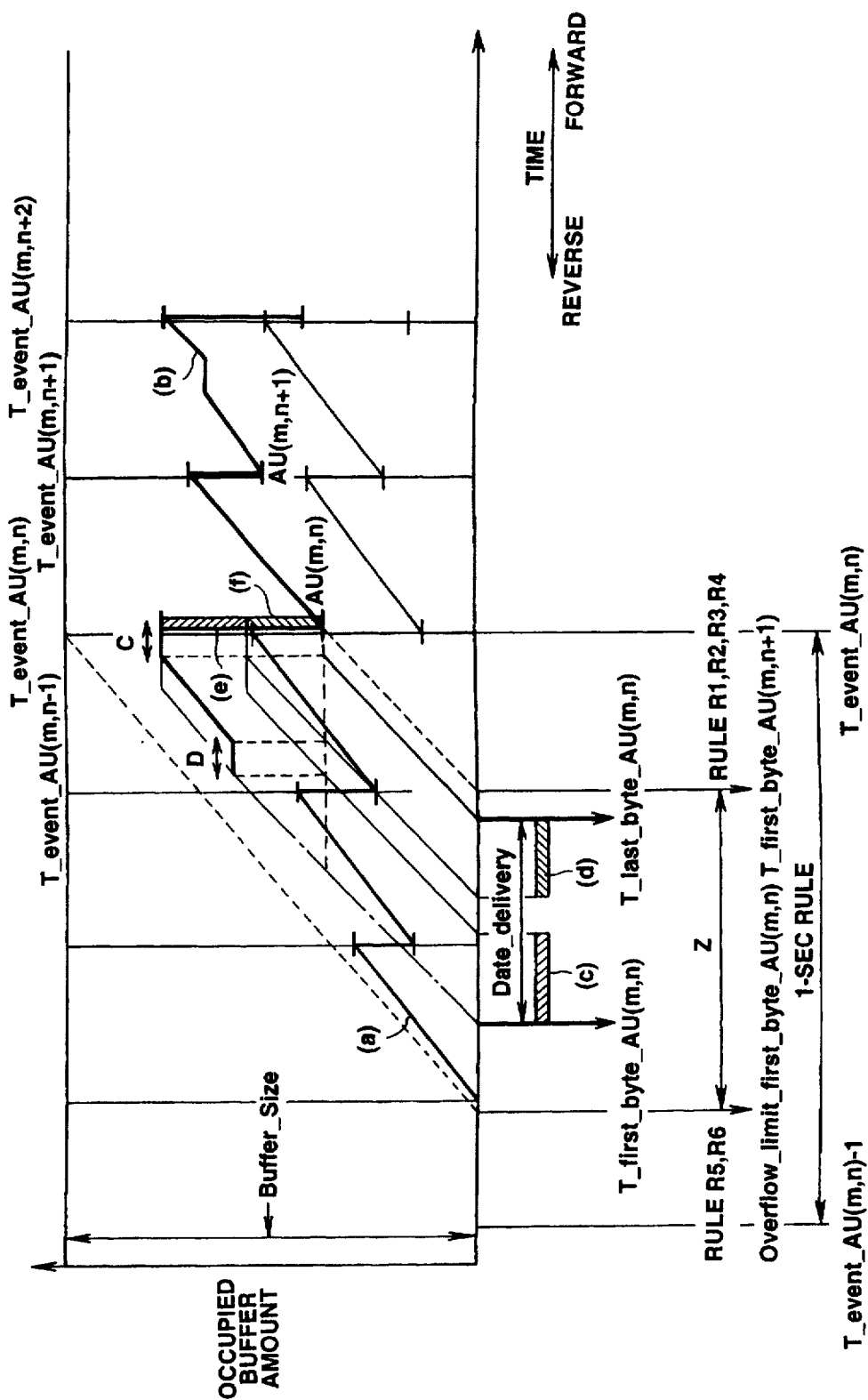
FIG. 13 illustrates an example of a schedule of supplying data to the first and last packets of an arbitrary accessing unit A(m, n).

FIG. 13 shows an example of data delivery scheduling under the above-described constraint condition. FIG. 13 an example in which data delivery scheduling until the event time of the accessing unit AU(m, n-a) is set with reference to the event time of a given accessing unit AU(m, n) in case of multiplexing in accordance with the STD model in the temporally retrogressive direction on the time axis of the video data generated in accordance with the VBV model in the positive direction of the time axis. In the example of FIG. 13, the accessing unit AU(m, n) is split into two packets and supplied to the buffer.

The time T__ first__ byte__ AU(m, n) in FIG. 13 has been arbitrarily selected after time Y in FIG. 12 under the conditions of the rules R5 and R6. On the other hand, the time T__ last__ byte AU(m, n) in FIG. 13 has been arbitrarily selected within the time width X of FIG. 11 under the conditions of the rules R1 to R4.

The time width Z in FIG. 13 is found from the time Y and the time width X, and denotes the degree of freedom in the scheduling of data delivery concerning the respective bytes of the accessing unit AU(m, n). That is, the data delivery scheduling for the respective bytes can be changed freely if within this time width Z.

FIG. 13 shows an instance in which the accessing unit AU(m, n) is split into two packets. In FIG. 13, changes in the occupied amount of the buffer in the VBV model are shown by a polygonal line or a curve (a), whereas those in the occupied amount of the buffer in the STD model are shown by a polygonal line or a curve (b). Although the accessing units are extracted from the buffers in the two models at the same time, the extraction time points are shown with an offset for ease in understanding, as indicated by respective curves (a) and (b) at time point T__ event__ AU(m, n+2). Data delivery for al packets needs to be performed within T__ first__ byte__ AU(m, n) and T__ last__ byte__ AU(m, n) as computed from the constraint of the rules R1 to R6.

Figure 5:
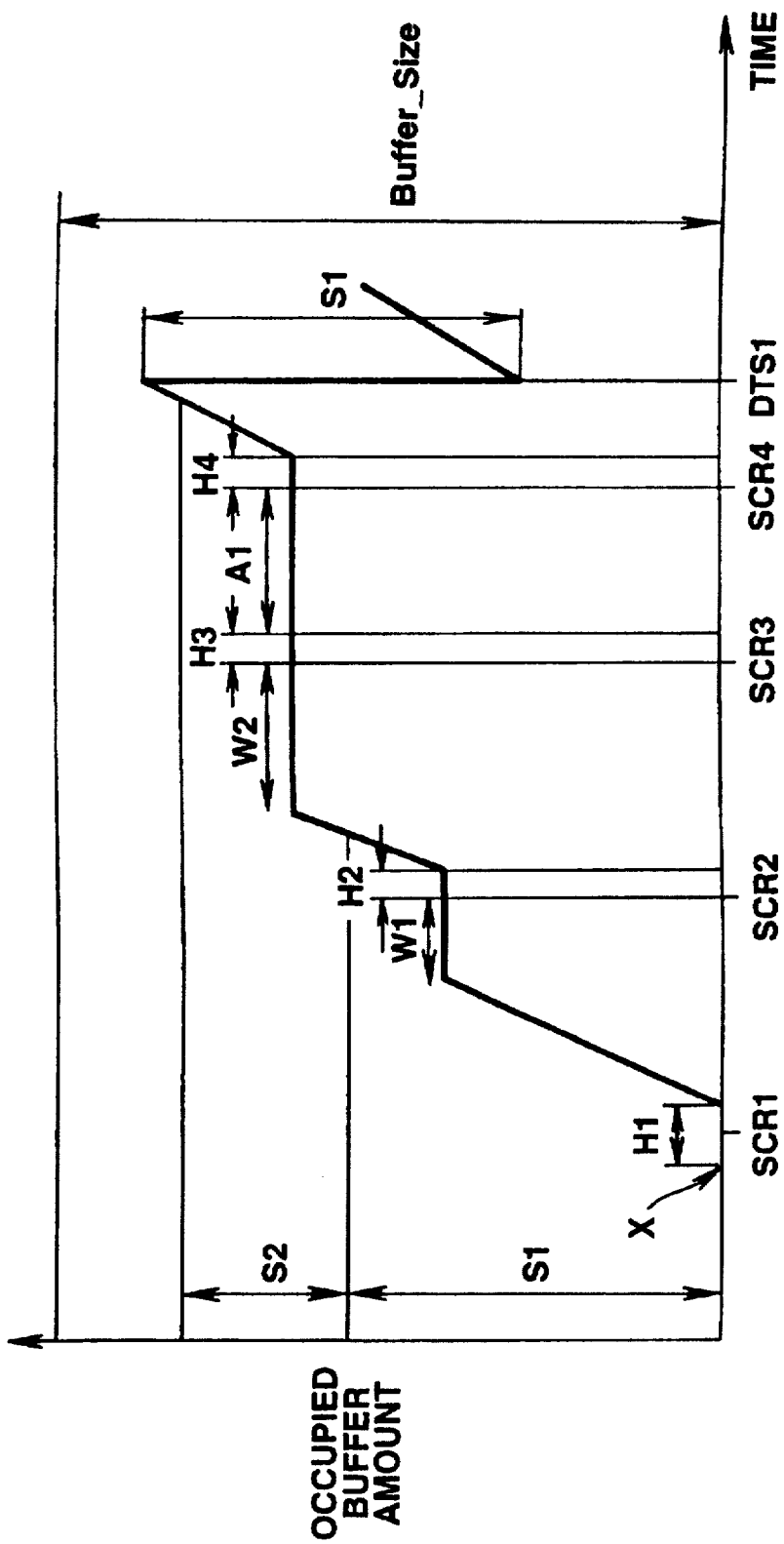
FIG. 5 illustrates changes in the occupied amounts of a video buffer in an STD model for explanation control of the buffer data input/output by time stamps.
Figures 6A, 6B:
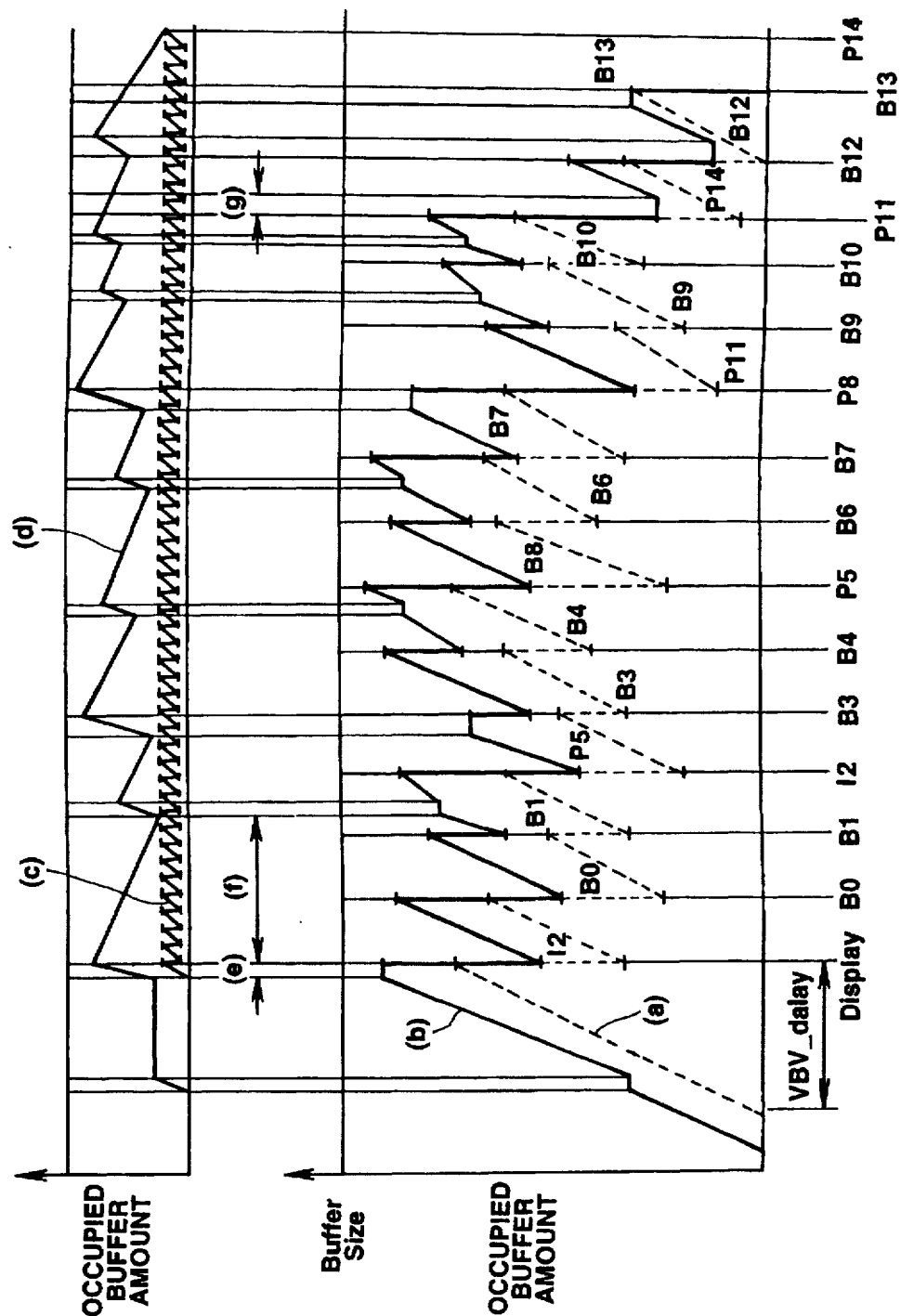
FIGS. 6A and 6B illustrate a basic example of changes in the occupied amounts of the STD buffer caused by multiplexing.
Figure 7A:
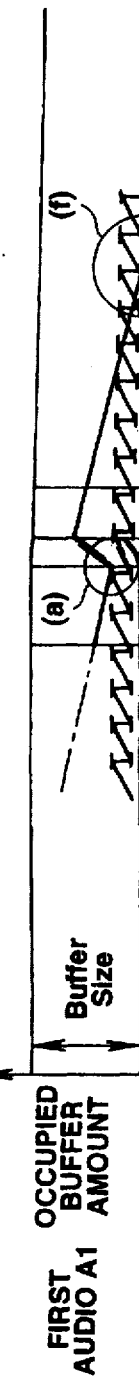
FIGS. 7A, 7B and 7C illustrate specified examples of changes in the occupied amounts of the STD buffer in case of inappropriate multiplexing scheduling.
Figure 7B:
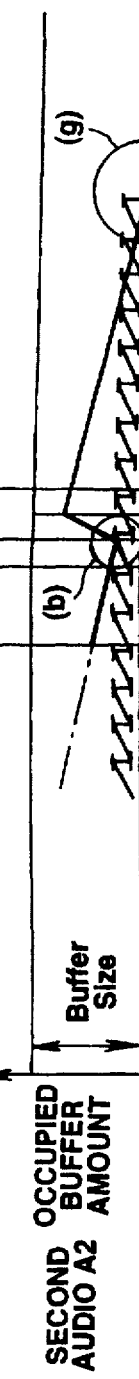
Figure 7C:
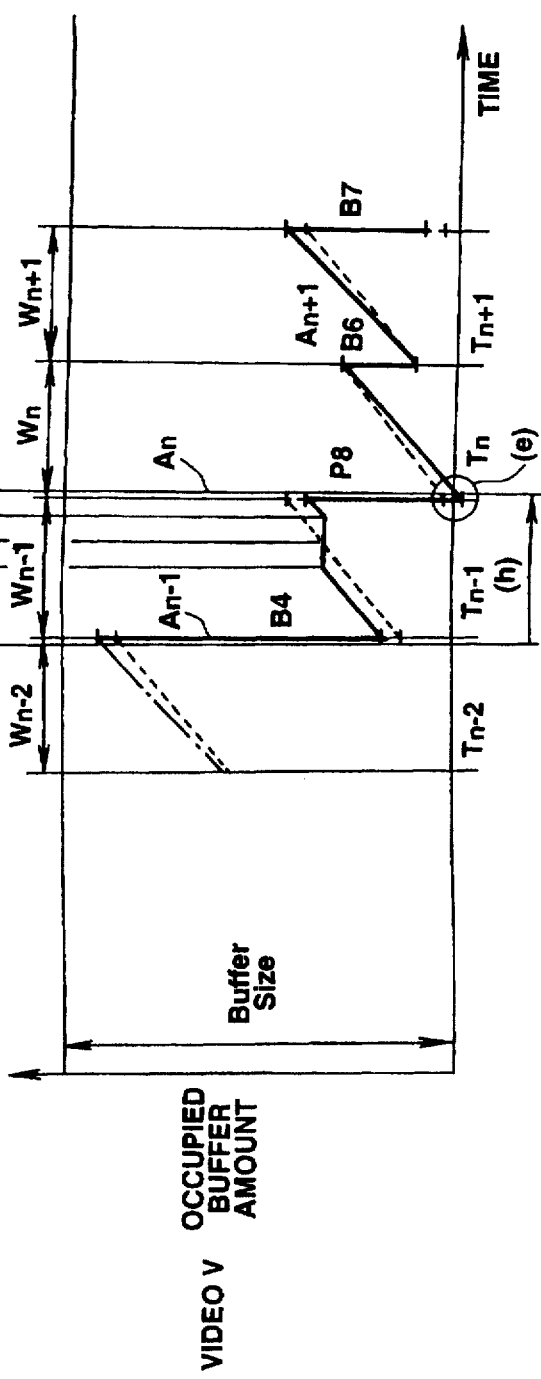

That is, if data delivery time is Data__ delivery, T__ first__ byte__ AU(m, n)<Data delivery of the stream data, such as time widths C and D in FIG. 5, between two packets. These domains are used for delivery of data of other streams, such as an audio stream. If data delivery to another stream is requested, any data delivery schedule is possible within the range allowed by the equation (9).

In addition, the constraint specified by the equation (9) is an extremely tolerant rule as long as the freedom for multiplexing is concerned, and permits safe scheduling not liable to rupture in case plural streams are multiplexed. This method is difficult to apply in case of doing forward pre-reading for processing. Thus, in the resent embodiment, temporal retrogressive pre-reading is used for enabling the present method to be applied.

In FIG. 13, the data delivery time width for the first packet of the accessing unit AU(m, n) and the data delivery time width for the last packet of the accessing unit AU(m, n) are shown at (c) and (d), respectively, as an example of the delivery schedule of data of the first and last packets of the accessing unit AU(m, n). Also, in FIG. 13, the first packet of the accessing unit AU(m, n) and the last packet of the accessing unit AU(m, n) are shown at (e) and (f), respectively.

Figure 14:
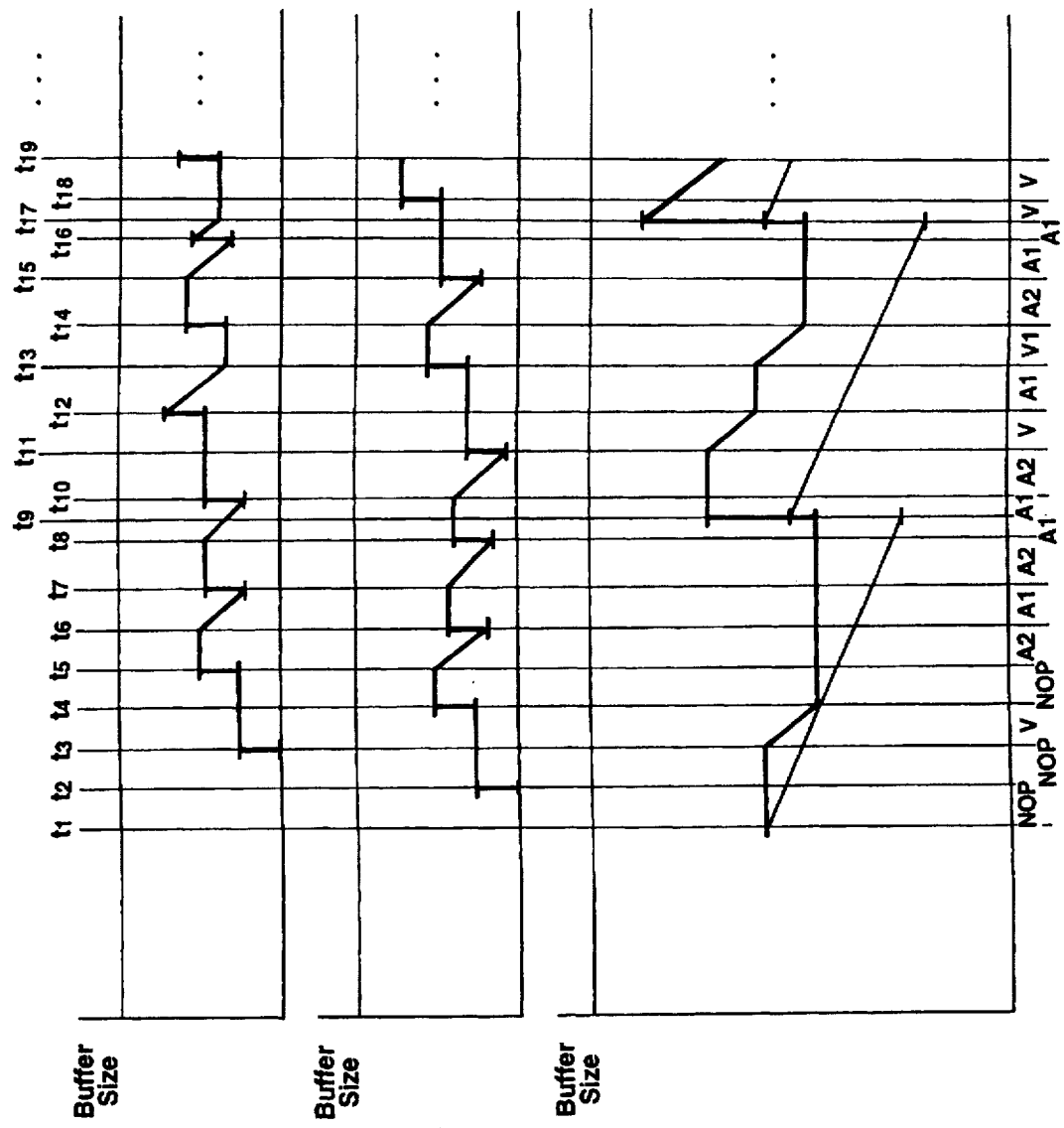
FIGS. 14A, 14B and 14C illustrate an example of scheduling in multiplexing in a reverse direction.

Referring to FIG. 14, the sequence of operations for multiplexing in the retrogressive direction s explained.

In the instance of FIG. 14, multiplexing scheduling is made for a video stream and two audio streams. Since the processing is made in its entirety in the temporally retrogressive direction, the accessing units are fed to the buffer instantly beginning from the last accessing unit, and are extracted from the buffer at the MUX rate in accordance with the multiplexing scheduling.

The demultiplexing occurs with the event time of occurrence of the accessing units of the respective elementary streams as a reference. In this figure, the event time points of the accessing units are denoted as $t_1$, $t_2$, $t_1$, and so forth. The multiplexing scheduling is determined depending on which accessing unit of which elementary stream the transmission band between the event time points is to be allocated to. Of course, data delivery of the accessing units needs to be made between time points T__ first__ byte__ AU(m, n) and T__ last__ byte__ AU(m, n) as computed under the constraint of the respective rules. The basic processing of demultiplexing is to allocate the transmission band on the event basis. The time duration of each event time interval is denoted as TimeSlice[$t_1$, $t_2$] and so forth. A band is allocated to a stream the buffer for which is like to overflow. If there aren t is likely to lie below that of the VBV model, band allocation is stopped. If, in a given time slice TimeSlice, there is no elementary stream to which a band is to be allocated, transmission band allocation is stopped by appending a pack header for forming a pack in the case of a multiplexed stream of, for example, the above-mentioned international standards ISO13818-1 and ISO11172-1. The reason is that the SCR is stated in the pack header and the data delivery time to each STD buffer can be controlled by adjusting the SCR value. That is, if, at a given time point, there is no necessity of allocating the transmission band to any elementary stream, a pack header (SCR) is appended and data delivery is stopped until the next event time.

An illustrative example of the data delivery schedule is explained by referring to FIG. 14. FIG. 14A, B and C illustrate an STD buffer model of the first audio stream A1, an STD buffer model of the second audio stream A2 and a video STD buffer model, respectively. First, the time $t_1$, and the time $t_2$ in FIG. 14 denote the event time for the video stream V and that for the second audio stream, respectively. Since there is a possibility of the occupied amount of the STD buffer becoming smaller than that of the VBV buffer to produce buffer underflow, no transmission band is allocated to the time slide TimeSlice[$t_1$, $t_2$] between time $t_1$, and time $t_2$. Such case of allocation of no transmission band is specified by NOP (No Operation).

The time slice TimeSlice[$t_2$, $t_3$] is similarly NOP.

For the time slide TimeSlice[$t_1$, $t_2$], no underflow is produced on extraction from the video stream, so that a transmission band is allocated to the video stream.

The time slice TimeSlice[$t_2$, $t_3$] is similarly NOP because band allocation is likely to produce underflow in each case.

For the time slice TimeSlice[$t_5$, $t_6$], the occupied amount of the audio stream A2 is large and hence overflow is most likely to be produced. Therefore, a transmission band is allocated to this time slice.

For the time slice TimeSlice[$t_6$, $t_7$], the occupied amount of the audio stream A1 is large and hence overflow is most likely to be produced. Therefore, a transmission band is allocated to this time slice.

For the time slice TimeSlice[$t_7$, $t_8$], the occupied amount of the audio stream A2 is large and hence overflow is most likely to be produced. Therefore, a transmission band is allocated to this time slice.

For the time slices TimeSlice[$t_8$, $t_9$] and TimeSlice[$t_9$, $t_{10}$], the occupied amount of the audio stream A2 is large and hence overflow is most likely to be produced. Therefore, a transmission band is allocated to each of these time slices.

For the time slice TimeSlice[$t_{10}$, $t_{11}$], the occupied amount of the audio stream A2 is large and hence overflow is most likely to be produced. Therefore, a transmission band is allocated to this time slice.

For the time slices TimeSlice[$t_{11}$, $t_{12}$], the occupied amount of the video stream is large and hence overflow is most likely to be produced. Therefore, a transmission band is allocated to this time slice.

For the time slices TimeSlice[$t_{12}$, $t_{13}$], the occupied amount of the audio stream A1 is large and hence overflow is most likely to be produced. Therefore, a transmission band is allocated to this time slice.

For to this time slice.

For the time slices TimeSlice[$t_{14}$, $t_{15}$], the occupied amount of the audio stream A2 is large and hence overflow is most likely to be produced. Therefore, a transmission band is allocated to this time slice.

Subsequently, the processing operation proceeds in a similar manner.

The above operation is directed to simple multiplexing for a video stream and two audio streams. If the number of streams for multiplexing is increased to a sum total of N, the similar sequence of operations may be used for multiplexing.

Figure 15:
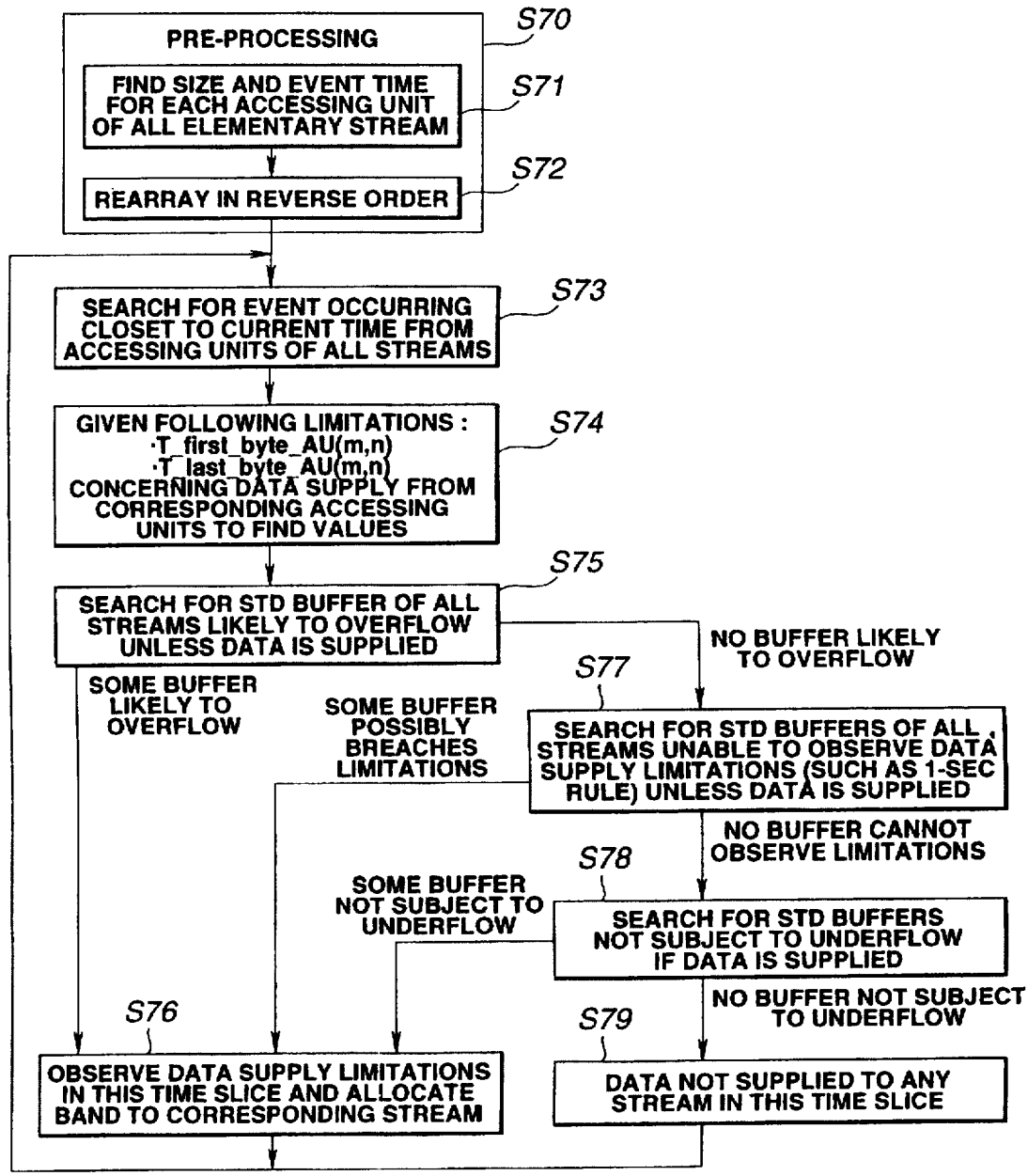
FIG. 15 illustrates an example of a data delivery scheduling decision algorithm.

An example of an algorithm for determining the above-described data delivery schedule is explained by referring to FIG. 15.

In this figure, the size and the event time pints of all accessing units are obtained in the temporally reverse order by the pre-processing in a pre-processing routine S70. This pre-processing routine S70 has a step S71 of finding the size and the event time of all accessing units of all elementary streams and a step S72 of arraying the size and the event time in the temporally reverse order.

In the first step S73 next to this pre-processing, the accessing units are traced in the reverse order beginning from the accessing unit currently processed in order to find the closest event AU(m, n). The time duration until this event time is the above time slice TimeSlice to which the transmission bard is allocated.

At the next step S74, the parameter concerning data delivery limitation, that is the above time points T__ first__ byte__ AU(m, n) and T__ last__ byte__ AU(m, n) are found from the closest accessing unit that has newly occurred.

At the next step S75, the STD buffers of all streams are checked in order to check such STD buffer which is likely to overflow failing data delivery. It is because such STD buffer is most in need of data delivery. If such STD unit is found, processing transfers to step S76 where data is delivered to this time slice in accordance with the above data delivery limitation.

If, at the step S75, there is no STD buffer likely to overflow, processing transfers to step S77 in order to search for such STD buffer for which data delivery limitation, such as the 1-second rule, can not be observed failing data delivery. If there is such STD buffer, processing transfers to step S76 in order to deliver data to this time slice timeSlice in accordance with the above data delivery limitations.

If there is no STD buffer corresponding to the conditions of the steps S75 and S77, processing transfers to step S78 to check the STD buffers of all streams in order to check for such STD buffer as is not likely to overflow on data delivery. If there is any such STD buffer, processing transfers to step S76 to deliver data to this time slice TimeSlice in accordance with data delivery limitations. This method will be explained later as a highly efficient data delivery scheduling method for multiplexing.

If there is no STD buffer corresponding to the conditions of the steps S75, S77 or S78, processing transfers to step S79 where data delivery is discontinued since there is no necessity of data delivery to this time slice TimeSlice. In the above-mentioned international standards ISO13818-1 and 11172-1, a pack header inclusive of the SCR values is appended for forming a pack.

The above operations represent processing for a time slice TimeSlice. Processing then reverts to step S73 in order to perform processing for the next time slice TimeSlice.

In the above-described multiplexing in the temporally retrogressive direction, advance data scheduling can be realized more easily than in case of processing in the forward direction, thus assuring more safe and efficient multiplexing.

The highly efficient data scheduling method in the above multiplexing is now explained.

In a storage medium, such as a disc, since the total amount of recordable data is pre-set, highly efficient scheduling is desired in which the overhead appended for multiplexing is as small as possible in order to permit recording of as many elementary streams, such as video or audio streams, as possible. The overhead by multiplexing depends on which method is used for allocating the transmission band for each elementary stream. The method of realizing high efficiency multiplexing which will minimize the overhead is hereinafter explained.

The basic structure of the multiplexed stream prescribed in the above-mentioned international standards ISO13818-1 and 11172-1 is packets and packs. The high efficiency multiplexing may be said to consist in minimizing the total overhead in forming packets and packs, that is the total data volume of the packet headers and pack headers. In an application in which video CDs, for example, are of a fixed pack length, the number of the packets or packet headers appended to the video or audio data is decreased by enlarging the length of the individual packets, in effect the data length of video or audio data contained in the individual packets. The sequence of operations for minimizing the overhead will now be explained taking an illustrative case of using a fixed value for the pack length. The packet length, however, is variable.

First, the total amount of data (ps(T)) of a set of packets formed up to the current time since formation of a directly previous pack is found. If there is no packet formed since formation of the directly previous pack up to the packet formed up to the current time, the value of ps(T) is zero. If the following equation:

$$\text{buffer\_\_ occupancy}(m, T) \geq (PS-ps(T))-(PH+ph) \quad (10)$$

holds for the occupied amount of the buffer (buffer__ occupancy(m, T)) at the current time point of an elementary stream m as a candidate for band allocation, band allocation is performed for the elementary stream m.

That is, if there is no sufficient amount of data stored in a buffer of a candidate elementary stream m, band allocation, that is packet formation, is not made for the elementary stream. The sufficient amount of data means (PS−ps) of the equation 10 representing the vacant pack capacity less (PH+ph) of the equation 10 representing the length of the pack header, that is the right side of the equation 10, and hence means the maximum data length that can be inserted into a packet being formed. However, the present condition applies to such case in which, for the elementary stream m, there is no limitation concerning buffer overflow or one-second rule at the next event time. That is, the present condition applies only to data delivery at step S78 of the flowchart of FIG. 15.

If the above equation 10 is not met and band allocation is not done for the elementary stream m, band allocation is done for another bitstream in accordance with the above-described sequence of operations. If the condition of the equation 10 is not met with the buffer of the other elementary stream, the processing operation (i) or (ii) is performed for realization of high efficiency multiplexing:

(i) If ps(T) is zero, that is if no packet has been formed since formation of the directly previous pack up to the current time, no new packet is formed, but the storage of a sufficient amount of data in each buffer by the next event time is awaited;

(ii) if ps(T) is not zero, such one of candidate elementary streams that can form the largest packet is selected as an object of band allocation for forming a packet. The above operation is continued until completion of a pack. If no data is stored in any buffer of the elementary stream, a padding packet (dummy data) prescribed in, for example, the above-mentioned international standards ISO13818-1 and 11172-1, is inserted for completing the pack.

By performing data delivery scheduling for the decoder buffer of each elementary stream in the temporally retrogressive direction based on the size of each accessing unit, advance data delivery scheduling becomes possible to a theoretically infinite extent, so that, if plural elementary streams are multiplexed, simple data delivery scheduling becomes possible, thus assuring safe multiplexing free of buffer rupturing.

By recording the multiplexed stream obtained on multiplexing plural elementary streams in accordance with multiplexing scheduling as described above on a recording medium, such as a magneto-optical disc or a magnetic tape, there may be obtained a digital signal recording medium having recorded thereon a multiplexed stream free of buffer breakage on decoding despite multiplexing of a large number of elementary streams.

The above description has been directed to a high efficiency band allocation method for each stream having a fixed pack length. The above method renders it possible to minimize the overhead by using the pack size as the basic processing unit. Moreover, if the pack length is not fixed but is variable, the basic processing unit can be set to 2048 bytes by setting PS and PH to 2048 bytes and zero, respectively, thus similarly enabling high-efficiency multiplexing scheduling.

The present invention is not limited to multiplexing scheduling in the temporally retrogressive direction, but may also be applied to multiplexing scheduling in the temporally forward direction.

We claim:

1. A signal multiplexing method for multiplexing plural input bitstreams of digital signals for generating a multiplexed bitstream, comprising:

computing, from the input plural bitstreams, the time point of extracting each accessing unit, as a processing unit prescribed from bitstream to bitstream, from a buffer of an associated decoder;

back-computing delivery start time to the buffer of each accessing unit by processing proceeding in a temporally retrogressive direction, using data of the extraction time of each accessing unit, and by reading charging of the accessing unit to the buffer for extraction of the accessing unit from the decoder buffer; and determining the scheduling of packetizing of the accessing units based on the thus computed delivery start time of the accessing units to the buffer.

2. The digital signal multiplexing method as claimed in claim 1 wherein the input time to the buffer of the last byte of the past packet of the accessing unit is set so as to be temporally previous to the extraction time point of the accessing unit.

3. The digital signal multiplexing method as claimed in claim 1 wherein the input time to the buffer of the last byte of the past packet of the accessing unit is set so as to be temporally previous to the input time point to the buffer of the first byte of the first packet of the next accessing unit.

4. The digital signal multiplexing method as claimed in claim 1 wherein the last byte of the last packet of the accessing unit is removed from the buffer within one second after the input time to the buffer.

5. The digital signal multiplexing method as claimed in claim 1 wherein the input time point of the last byte of the last packet of the accessing unit to the buffer is temporally posterior to the limit time of producing buffer overflow.

6. The digital signal multiplexing method as claimed in claim 1 wherein the input time point of the first byte of the first packet of the accessing unit is within one second from the time of extraction of the accessing unit.

7. The digital signal multiplexing method as claimed in claim 1 wherein the input time point of the first byte of the first packet of the accessing unit to the buffer is posterior to the limit time of buffer overflow.

8. A signal multiplexing apparatus for multiplexing plural in a multiplexed bitstream, comprising:

means for computing, from the input plural bitstreams, the time point of extracting each accessing unit, as a processing unit prescribed from bitstream to bitstream, from a buffer of an associated decoder;

means for back-computing delivery start time to the buffer of each accessing unit by processing proceeding in a temporally retrogressive direction, using data of the extraction time of each accessing unit, and by reading charging of the accessing unit to the buffer for extraction of the accessing unit from the decoder buffer; and means for determining the scheduling of packetizing of the accessing units based on the thus computed delivery start time of the accessing units to the buffer.

9. A digital signal recording medium on which is recorded a signal obtained by multiplexing a plurality of input bitstreams in such a manner that, from the input plural bitstreams, the time point of extracting each accessing unit, as a processing unit prescribed from bitstream to bitstream, from a buffer of an associated decoder, is computed, the delivery start time to the buffer of each accessing unit is back-computed by processing proceeding in a temporally retrogressive direction, using data of the extraction time of each accessing unit, and by charging of the accessing unit to the buffer is read for extraction of the accessing unit from the decoder buffer, and the scheduling of packetizing of the accessing units is determined based on the thus computed delivery start time of the accessing units to the buffer.

* * * * *